(12) United States Patent
Ahn

(10) Patent No.: US 8,771,861 B2
(45) Date of Patent: Jul. 8, 2014

(54) SECONDARY BATTERY AND METHOD FOR MANUFACTURING THE SAME

(75) Inventor: Changbum Ahn, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 384 days.

(21) Appl. No.: 12/884,023

(22) Filed: Sep. 16, 2010

(65) Prior Publication Data
US 2011/0064991 A1 Mar. 17, 2011

Related U.S. Application Data

(60) Provisional application No. 61/242,909, filed on Sep. 16, 2009.

(51) Int. Cl.
*H01M 6/42* (2006.01)
*H01M 2/00* (2006.01)
*H01M 2/02* (2006.01)

(52) U.S. Cl.
USPC ........... 429/153; 429/151; 429/163; 429/162; 429/177; 429/178

(58) Field of Classification Search
CPC .......................... H01M 2/0202; H01M 2/0217
USPC .................. 429/153, 163, 151, 162, 177, 178
See application file for complete search history.

(56) References Cited

U.S. PATENT DOCUMENTS

| 2002/0081491 | A1 | 6/2002 | Gross et al. |
| 2004/0048149 | A1 | 3/2004 | Gross et al. |
| 2008/0305398 | A1 | 12/2008 | Komiya |
| 2010/0047685 | A1 | 2/2010 | Lee et al. |

FOREIGN PATENT DOCUMENTS

| JP | 2001-102050 | 4/2001 |
| JP | 2003-092100 | 3/2003 |
| JP | 2008-052932 | 3/2008 |
| JP | 2008-091269 | 4/2008 |
| JP | 2008-204706 | 9/2008 |
| KR | 10-2007-0099068 | 10/2007 |
| KR | 10-2008-0009350 | 1/2008 |
| KR | 10-2008-0010738 | 1/2008 |
| KR | 10-2008-0017264 | 2/2008 |
| WO | WO 02/39516 | 5/2002 |
| WO | WO 02/45186 | 6/2002 |

OTHER PUBLICATIONS

European Search Report dated Nov. 17, 2010 in European Application No. 10177083.2.
Office Action dated Jan. 8, 2013 for corresponding JP Application No. 2010-208277.

*Primary Examiner* — Helen O Conley
(74) *Attorney, Agent, or Firm* — Knobbe Martens Olson & Bear LLP

(57) ABSTRACT

A secondary battery and a method for manufacturing the same, the secondary battery includes an electrode assembly and a pouch, the electrode assembly having a first electrode, a second electrode, and a separator disposed between the first electrode and the second electrode and insulating the first electrode and the second electrode from each other, the pouch configured to have a bottom face and lateral faces extending from edges of the bottom face and including a cavity to accommodate the electrode assembly. The pouch includes an alignment protrusion provided on its lateral face. The electrode assembly including an alignment indentation provided at its edge. The alignment indentation corresponds to the alignment protrusion of the pouch.

29 Claims, 22 Drawing Sheets

SECONDARY BATTERY AND METHOD FOR MANUFACTURING THE SAME

CROSS-REFERENCE TO RELATED APPLICATION

This application claims the benefit of U.S. Provisional Application No. 61/242,909, filed Sep. 16, 2009, in the U.S. Patent and Trademark Office, the disclosure of which is incorporated herein by reference.

BACKGROUND

1. Field

Aspects of the present invention relate to a secondary battery and a method for manufacturing the same.

2. Description of the Related Art

Recently, the use of portable electronic devices has increased with the rapid development of communication and computer industries. Rechargeable secondary batteries are widely used as power sources of portable electronic devices.

A secondary battery includes an electrode assembly and a pouch. The electrode assembly including a first electrode, a second electrode, and a separator disposed between the first electrode and the second electrode and insulating the first electrode and the second electrode from each other.

In the electrode assembly, it is important to maintain proper alignment of the first electrode and the second electrode. To address the alignment issue, additional apparatuses or methods have conventionally been used.

SUMMARY

Aspects of the present invention provide a secondary battery, which can easily achieve alignment of a first electrode and a second electrode, and a method for manufacturing the same.

Aspects of the present invention also provide a secondary battery, in which an electrode assembly including a first electrode, a second electrode, and a separator can be easily assembled with a pouch, and a method for manufacturing the same.

Aspects of the present invention further provide a secondary battery, in which an electrode assembly including a first electrode, a second electrode, and a separator can be easily assembled with a double-cavity pouch, and a method for manufacturing the same.

According to an aspect of the present invention, a secondary battery includes an electrode assembly and a pouch, the electrode assembly including a first electrode, a second electrode, and a separator disposed between the first electrode and the second electrode and insulating the first electrode and the second electrode from each other, the pouch configured to have a bottom face and lateral faces extending from edges of the bottom face and including a cavity to accommodate the electrode assembly, wherein the pouch includes at least one alignment protrusion provided on its lateral face, and the electrode assembly includes at least one alignment indentation provided at its edge, the at least one alignment indentation corresponding to the alignment protrusion of the pouch.

According to another aspect of the present invention, there is provided a method for manufacturing a secondary battery, the method including: preparing a pouch having a cavity, the pouch including at least one alignment protrusion protruding toward the cavity, preparing a first electrode including at least one alignment indentation corresponding to the at least one alignment protrusion, a second electrode and a separator, stacking the first electrode, the second electrode with the separator disposed between the first electrode and the second electrode, wherein the stacking of the first electrode, the separator and the second electrode is performed by the at least one alignment protrusion and the at least one alignment indentation; and sealing the pouch.

According to another aspect of the present invention, alignment of a first electrode and a second electrode can be easily achieved.

According to another aspect of the present invention, an electrode assembly including a first electrode, a second electrode, and a separator can be easily assembled with a pouch.

According to another aspect of the present invention, an electrode assembly including a first electrode, a second electrode, and a separator can be easily assembled with a pouch having a double-layered structure.

According to another aspect of the present invention, the cavity has a rectangular prism shape formed by the bottom surface of the pouch and being rectangular, the lateral surfaces form four planes and four corners, and each corner formed by each two adjacent planes of the four planes of the lateral surfaces includes one of the at least one protrusion.

According to another aspect of the present invention, a sealing part of the battery extends from the lateral surfaces of the pouch.

According to another aspect of the present invention, the pouch has a three-layered structure, including an intermediate layer and two outer layers.

According to another aspect of the present invention, the intermediate layer comprises a film made of a metal, and the two outer layers comprise an insulating material.

According to another aspect of the present invention, the metal includes aluminum (Al) or copper (Cu).

According to another aspect of the present invention, the at least one alignment protrusion has a horizontal section with a central angle of 90 degrees.

According to another aspect of the present invention, the at least one alignment indentation is a horizontal section having an arc shape indented into the electrode assembly.

According to another aspect of the present invention, the at least one alignment indentation is formed in at least one of the first electrode, the second electrode and the separator of the electrode assembly.

According to another aspect of the present invention, the electrode assembly has a stacked structure in which the first electrode, the separator, and the second electrode are stacked.

According to another aspect of the present invention, a size of the separator is greater than a size of the first and second electrode.

According to another aspect of the present invention, the separator is an insulating-layer separator and is provided on an entire surface of the first electrode or the second electrode, and the first electrode and the second electrode are repeatedly stacked.

According to another aspect of the present invention, the separator includes at least one insulating-layer separator provided on upper and lower surfaces of the first electrode or the second electrode, and the first electrode and the second electrode are repeatedly stacked to form at stacked structure.

According to another aspect of the present invention, the first electrode and the second electrode form the stacked structure by fusing edges of the insulating-layer separators around one of the first and second electrodes.

According to another aspect of the present invention, the electrode assembly includes first electrode tabs connected to first electrode leads and second electrode tabs connected to second electrode leads, wherein the tabs and leads are accommodated in a tab accommodating space formed between one face of the electrode assembly and one lateral surface of the pouch.

According to another aspect of the present invention, the tab accommodating space is provided by making a width of a portion of the electrode assembly adjacent to the tabs smaller than a width of the cavity.

According to another aspect of the present invention, the pouch includes a first tab cavity and a second tab cavity formed along one of the lateral surfaces of the pouch to accommodate electrode tabs of the electrode assembly.

According to another aspect of the present invention, the first tab cavity and the second tab cavity protrude outward from the one of the lateral surfaces of the pouch.

According to another aspect of the present invention, the pouch includes a main body and a cover.

According to another aspect of the present invention, the at least one alignment protrusion includes a plurality of the alignment protrusions and the main body includes the alignment protrusions on lateral surfaces of the main body, and the alignment protrusions have a semicircular cross sectional shape.

According to another aspect of the present invention, the at least one alignment protrusion includes a plurality of the alignment protrusions and the main body includes the alignment protrusions on lateral surfaces of the main body, and the alignment protrusions have a rectangular cross sectional shape.

According to another aspect of the present invention, the at least one alignment protrusion includes a plurality of the alignment protrusions and the main body includes the alignment protrusions at corners of lateral surfaces of the main body, and the alignment protrusions have a triangular cross sectional shape.

According to another aspect of the present invention, the at least one alignment indentation includes a plurality of alignment indentations and the electrode assembly includes the alignment indentations corresponding to the alignment protrusions on the lateral surfaces of the main body.

According to another aspect of the present invention, the electrode assembly includes a plurality of alignment indentations corresponding to the plurality of alignment protrusions provided on the lateral surfaces of the main body.

According to another aspect of the present invention, the electrode assembly includes a plurality of alignment indentations corresponding to the plurality of alignment protrusions provided at the corners of the lateral surfaces of the main body.

According to another aspect of the present invention, the cover has a same shape as the main body.

According to another aspect of the present invention, the cover includes a bottom surface and lateral surfaces extending from edges of the bottom surface and the cover includes the at least one alignment protrusion formed in at least one of the lateral surfaces.

According to another aspect of the present invention, the electrode assembly includes tab grooves formed on one side, the one side being a side from which first electrode tabs and second electrode tabs extend.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
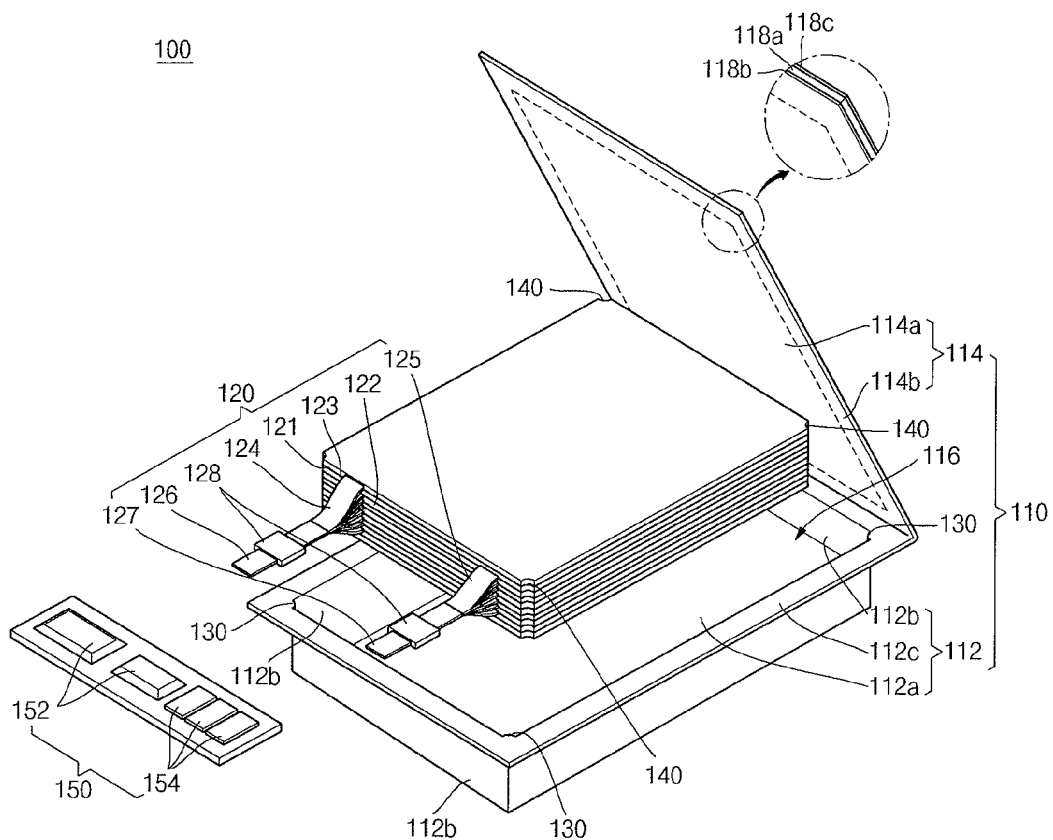
FIGS. 1A through 1F illustrate a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
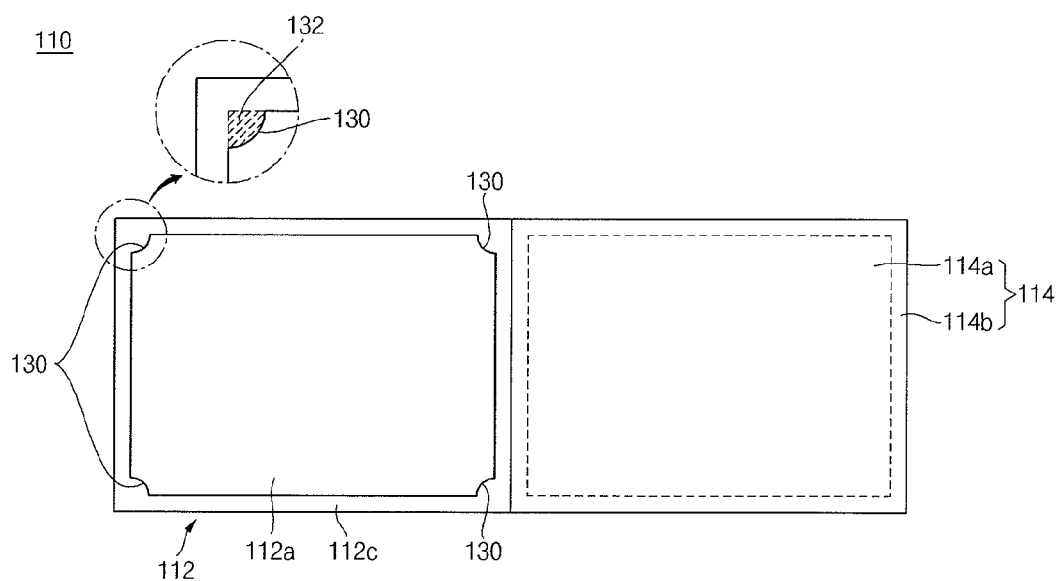
Figure 1C:
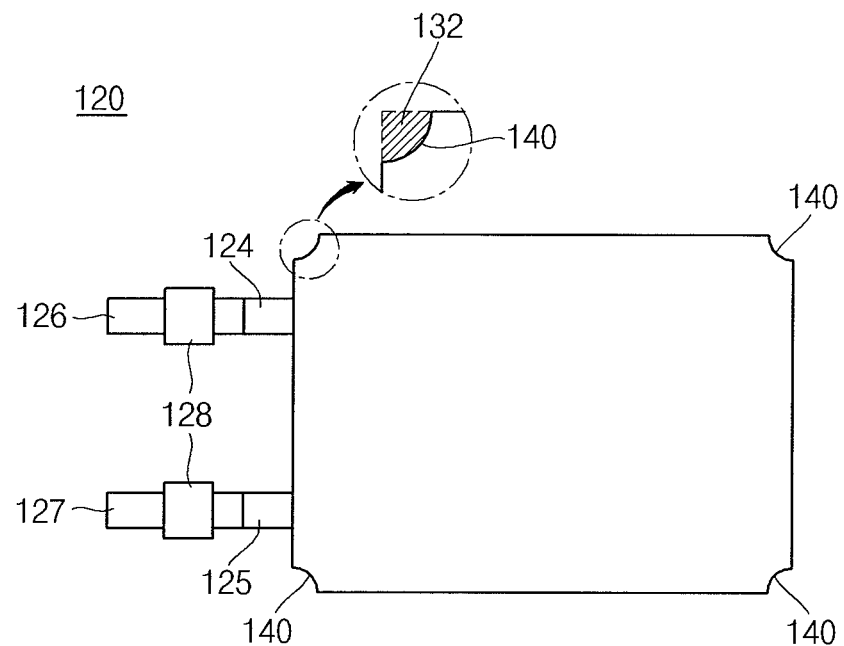
Figure 1D:
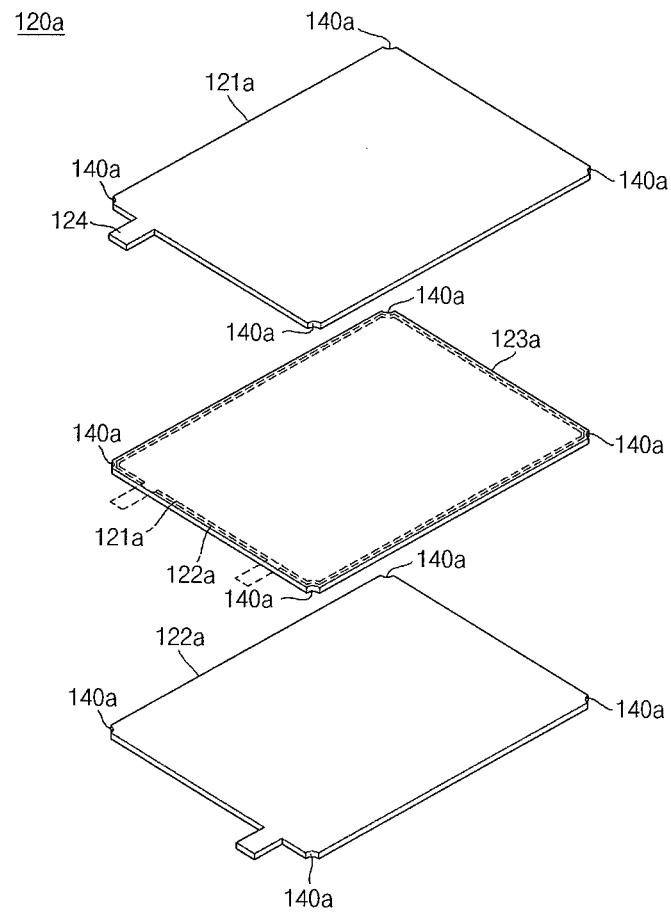
Figure 1E:
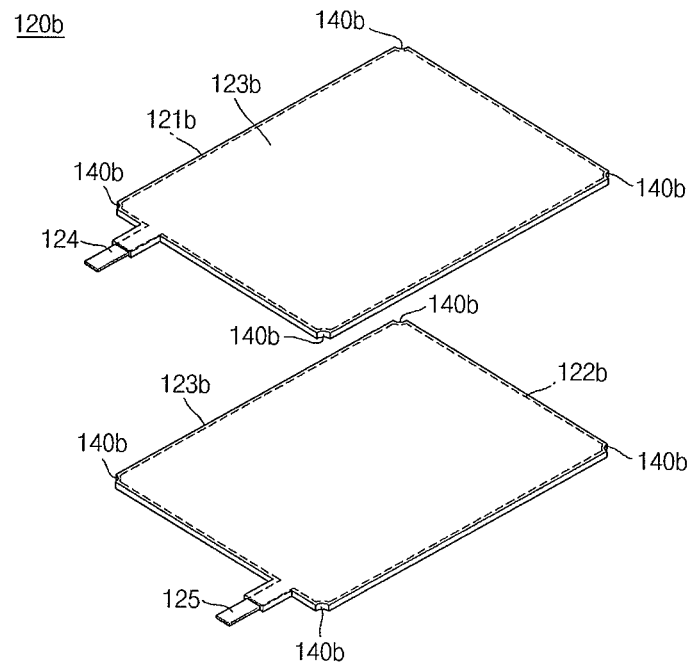
Figure 1F:
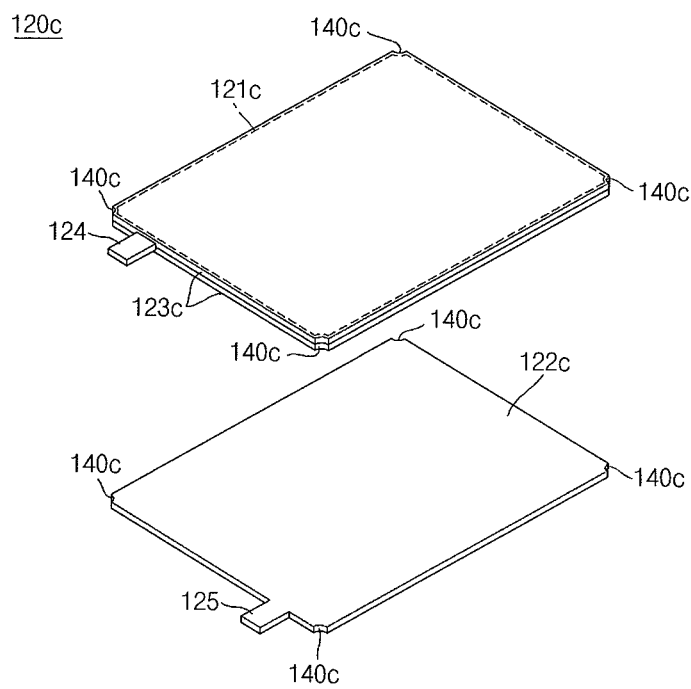

FIGS. 1A through 1F illustrate a secondary battery 100 according to an embodiment of the present invention. FIG. 1A is an exploded perspective view illustrating the secondary battery 100 according to an embodiment of the present invention. FIG. 1B illustrates a pouch 110 as one of component members of the secondary battery 100 shown in FIG. 1A. FIG. 1C illustrates a stack of an electrode assembly 120 of the secondary battery shown in FIG. 1A. FIGS. 1D through 1F illustrate stacked structures of the electrode assembly 120 as one of component members of the secondary battery 100 shown in FIG. 1A, in which a first electrode 121, a second electrode 122 and a separator 123 are stacked.

Referring to FIGS. 1A through 1F, the secondary battery 100 includes the pouch 110 and the electrode assembly 120. The pouch 110 includes at least one alignment protrusion 130, and the electrode assembly 120 includes at least one alignment indentation 140. In addition, the secondary battery 100 includes a protective circuit module 150.

The pouch 110 includes a main body 112 and a cover 114. The main body 112 includes a cavity 116, (i.e., a space to accommodate the electrode assembly 120). The main body 112 has a bottom face 112a and a lateral face 112b extending from the bottom face 112a shaped of a rectangle. The cavity 116 is provided in a space formed by the bottom face 112a and the lateral face 112b.

Referring to FIG. 1A, the cavity 116 has a hexagonal shape. The bottom face 112a is shaped like a rectangle. The lateral face 112b has four planes, and four corners formed by each two adjacent ones of the four planes of the lateral face 112b.

In addition, the main body 112 has a sealing part 112c extending from the lateral face 112b.

The cover 114 extends from a predetermined edge of the sealing part 112c of the main body 112. The cover 114 is hermetically sealed with the sealing part 112c of the main body 112 while covering the cavity 116, thereby sealing the secondary battery 100. Thus, the cover 114 includes a covering part 114a corresponding to the cavity 116 and a sealing part 114b corresponding to the sealing part 112c of the main body 112. While described as hermetically sealed, it is understood that the seal could be strong enough to contain liquid electrolytes.

The pouch 110 has a high strength. As shown in FIG. 1A, the pouch 110 may have a three-layered structure, including an intermediate layer 118a and outer layers 118b and 118c. Here, the intermediate layer 118a may be a film made of a metal, such as aluminum (Al) or copper (Cu), or alloys thereof. The outer layers 118b and 118c may be insulating layers, for example, a polymeric or ceramic layers.

When Al is used in the intermediate layer 118a the thickness is approximately 50 μm or greater. When the Cu is used in the intermediate layer 118a, the thickness is approximately 20 μm or greater. However, the thickness can be otherwise according to other materials as well as according to a size of the cavity 116 and electrode assembly 120.

The pouch 110 includes at least one alignment protrusion 130 formed on the lateral face 112b of the cavity 116.

Although FIG. 1B illustrates that the at least one alignment protrusion 130 is provided at the corner of the lateral face 112b, the aspects of the present invention are not limited to the illustrated example and the alignment protrusion 130 may be provided at any location of the lateral face 112b. In addition, FIG. 1B illustrates that the alignment protrusion 130 has a central angle of 90 degrees in view of a horizontal section, as indicated by a fan-shaped hatching region labeled 132 in FIG. 1B, but the aspects of the present invention are not limited thereto.

As described above, the electrode assembly 120 includes the first electrode 121, the second electrode 122 and the separator 123 insulating the first electrode 121 and the second electrode 122 from each other by placing the separator in a contacting portion of the first electrode 121 and the second electrode 122. It is understood that various types of electrolytes can be used in the secondary battery described above. For example, the secondary battery may use a liquid, gel or solid electrolyte.

In the electrode assembly 120, the first electrodes 121 and the second electrodes 122 are repeatedly stacked to sandwich each of the separators 123 therebetween. Each of the first electrodes 121 includes a first electrode coating portion provided on at least one surface thereof. Each of the second electrodes 122 includes a second electrode coating portion provided on at least one surface thereof. Here, the first electrodes 121 are positive electrodes and the second electrodes 122 are negative electrodes. Conversely, the first electrodes 121 may be negative electrodes and the second electrodes 122 may be positive electrodes.

The electrode assembly 120 includes first electrode tabs 124 extending from the respective first electrodes 121 and second electrode tabs 125 extending from the respective second electrodes 122. In addition, the electrode assembly 120 includes a first electrode lead 126 connected to the respective first electrode tabs 124 and a second electrode lead 127 connected to the respective second electrode tabs 125.

An insulating tape 128 is provided at each predetermined area of the first electrode lead 126 and the second electrode lead 127, respectively, thereby preventing the first electrode lead 126 and the second electrode lead 127 from being damaged when sealing the pouch 110 while insulating the first and second electrode lead 126 and 127 from the pouch 110.

The electrode assembly 120 includes at least one alignment indentation 140 formed at its edge. The at least one alignment indentation 140 corresponds to the alignment protrusion 130 of the pouch 110.

As shown in FIG. 1C, the alignment indentation 140 is formed to have a horizontal section shaped like an arc directed inward with respect to the electrode assembly 120. Here, the shape of the arc of the alignment indentation 140 may be substantially the same as that of fan 132 of the alignment protrusion 130, which corresponds to the hatching region 132 in FIG. 1C.

The alignment indentation 140, is formed in at least one of the component members of the electrode assembly 120. For example, the indentation 140 may be in each of the first electrode 121, the second electrode 122 and the separator 123, and facilitates proper alignment of the first electrode 121, the second electrode 122 and the separator 123 when the first electrode 121, the second electrode 122 and the separator 123 are accommodated in the cavity 116 of the pouch 110. However, the indentation 140 need not be formed in all of the electrodes 121, 122 and separator 123.

Here, the electrode assembly 120 having the alignment indentation 140 may be configured in various manners, as labeled 120a, 120b and 120c in FIGS. 1D through 1F. The electrode assembly 120a shown in FIG. 1D has a stacked structure in which a first electrode 121a, a separator 123a and a second electrode 122a are stacked according to an aspect of the present invention. The electrode assembly 120a is configured such that a size of the separator 123a is greater than that of either of the first electrode 121a and the second electrode 122a. In this embodiment, the separator 123a is largest in size, the second electrode 122a is middle-sized and the first electrode 121a is smallest in size. This is true when the first electrode 121a is a positive electrode and the second electrode 122a is a negative electrode. In a reversed case, that is, when the first electrode 121a is a negative electrode and the second electrode 122a is a positive electrode, the electrode assembly 120a may be configured such that the first electrode 121a is larger than the second electrode 122a.

An alignment indentation 140a is formed in each of the first electrode 121a, the separator 123a and the second electrode 122a, respectively. Thus, when the electrode assembly 120a (specifically, each of component members of the electrode assembly 120a including the first electrode 121a, the separator 123a and the second electrode 122a) is accommodated in the cavity 116, the alignment indentation 140a facilitates proper alignment of the component members of the electrode assembly 120a.

Accordingly, the electrode assembly 120a shown in FIG. 1D has a layered structure in which the first electrode 121a and the second electrode 122a are stacked with the separator 123a that is largest in size, interposed therebetween ensuring that the first electrode 121a is insulated from the second electrode 122a.

In addition, since the separator 123a is largest in size and the first electrode 121a and the second electrode 122a are relatively smaller than the separator 123a, the first electrode 121a and the second electrode 122a are opposed to each other with the separator 123a interposed therebetween. Here, if the first electrode 121a is smaller than the second electrode 122a, the first electrode 121a and the second electrode 122a are aligned such that the entire area of the first electrode 121a is opposed to part of the second electrode 122a, as indicated by dotted lines on the separator 123a shown in FIG. 1D.

If the electrode assembly 120 has the stacked structure, like the electrode assembly 120a shown in FIG. 1D, the contour of the electrode assembly 120 shown in FIG. 1C corresponds to that of the separator 123a, and the contour of the alignment indentation 140 shown in FIG. 1C also corresponds to that of the alignment indentation 140a shown in FIG. 1D.

The embodiment of the electrode assembly 120b shown in FIG. 1E has a stacked structure in which an insulating-layer separator 123b is provided on an entire surface of a first electrode 121b or on an entire surface of a second electrode 122b. The first electrode 121b and the second electrode 122b having the insulating-layer separator 123b are repeatedly stacked. Therefore, the electrode assembly 120b shown in FIG. 1E includes the insulating-layer separator 123b, rather than the separator 123a shown in FIG. 1D, and the insulating-layer separator 123b provided on the first electrode 121b or on the second electrode 122b performs the same function as the separator 123a shown in FIG. 1D. Therefore, the insulating-layer separator 123b insulates the first electrode 121b and the second electrode 122b from each other.

Although FIG. 1E illustrates that the insulating-layer separator 123b is provided on both of the first electrode 121b and the second electrode 122b, location of the insulating-layer separator 123b is not limited thereto. Therefore, the insulating-layer separator 123b may be provided on only one of the first electrode 121b and the second electrode 122b, in other embodiments.

In addition, FIG. 1E illustrates that the insulating-layer separator 123b is provided on a portion of each of the first electrode tab 124 and the second electrode tab 125. In the first electrode tab 124 and the second electrode tab 125 shown in FIG. 1E, portions without the insulating-layer separator 123b are to be connected with first and second electrode lead 126 and 127.

An alignment indentation 140b is formed in each of the first electrode 121b and the second electrode 122b, respectively. Thus, when the electrode assembly 120b (specifically, each of the component members of the electrode assembly 121b including the first electrode 121b and the second electrode 122b) is accommodated in the cavity 116, the alignment indentation 140b facilitates proper alignment. Accordingly, the electrode assembly 120b shown in FIG. 1E has a layered structure in which the first electrode 121b and the second electrode 122b are stacked with the insulating-layer separator 123b, thereby ensuring the insulation of the first electrode 121b and the second electrode 122b from each other by the insulating-layer separator 123b provided on the first electrode 121b and the second electrode 122b.

If the electrode assembly 120 has the stacked structure, like the electrode assembly 120b shown in FIG. 1E, the contour of the electrode assembly 120 shown in FIG. 1C may correspond to that of the insulating-layer separator 123b, and the contour of the alignment indentation 140 may also correspond to that of the alignment indentation 140b of the insulating-layer separator 123b.

The embodiment of the electrode assembly 120c shown in FIG. 1F has a stacked structure in which a first electrode 121c or a second electrode 122c are insulated from the exterior of the electrode assembly 120c by two sheets of separators 123c. The first electrode 121c and the second electrode 122c are repeatedly stacked.

Although FIG. 1F illustrates that the first electrode 121c is insulated from the exterior of the electrode assembly 120c by two sheets of separators 123c, this embodiment is not limited thereto. If necessary, the second electrode 122c may be insulated from the exterior of the electrode assembly 120c. Alternatively, both the first electrode 121c and the second electrode 122c may be insulated from the exterior of the electrode assembly 120c.

Here, the insulating of the first electrode 121c or the second electrode 122c may be performed by fusing edges of the two sheets of separators 123c when the first electrode 121c or the second electrode 122c are placed between the two sheets of separators 123c. The fusing of the edges of the two sheets of separators 123c is performed by fusing techniques such as, ultrasonic fusion or thermal fusion, but the invention is not limited thereto.

Referring to FIG. 1F, the first electrode 121c fused with the two sheets of separators 123c and the second electrode 122c are formed to have the same size. The reason for this is to facilitate proper alignment when the first electrode 121c fused with the two sheets of separators 123c is aligned with the second electrode 122c by the alignment protrusion 130 of the cavity 116.

Meanwhile, an alignment indentation 140c is formed in each of the first electrode 121c fused with the two sheets of separators 123c and the second electrode 122c, respectively. Thus, when the electrode assembly 120c (specifically, each of the component members of the electrode assembly 120c including the first electrode 121c is fused with the two sheets of separators 123c and the second electrode 122c) is accommodated in the cavity 116, the alignment indentation 140c facilitates proper alignment of the component members of the electrode assembly 120c. Accordingly, the electrode assembly 120c shown in FIG. 1F has a layered structure in which the first electrode 121c and the second electrode 122c with the two sheets of separators 123c are repeatedly stacked, thereby ensuring that the first electrode 121c and the second electrode 122c are insulated from each other by the two sheets of separators 123c.

If the electrode assembly 120 illustrated in FIG. 1C has the stacked structure, like the electrode assembly 120c shown in FIG. 1F, the contour of the electrode assembly 120 shown in FIG. 1C may correspond to that of the separator 123c or that of the first electrode 121c without the separator 123c fused thereto, and the contour of the alignment indentation 140 illustrated in FIG. 1C may also correspond to that of the alignment indentation 140c of the two sheets of separators 123c or to the first electrode 121c or to the second electrode 122c without the separator 123c fused thereto.

The protective circuit module 150 illustrated in FIG. 1A controls various operations of the secondary battery 100 as well as charge and discharge operations of the electrode assembly 120. The protective circuit module 150 includes control devices 152, such as IC devices, and so forth, to prevent an over-current from flowing through the secondary battery 100. In addition, the protective circuit module 150 includes external terminals 154 connecting the secondary battery 100 to external circuitry.

Although FIG. 1A illustrates that the control devices 152 and the external terminals 154 are provided on the same plane of the protective circuit module 150, the aspects of the present invention are not limited thereto. In an alternative embodiment, the control devices 152 and the external terminals 154 may be provided on different planes of the protective circuit module 150. The protective circuit module 150 is electrically connected to the first electrode lead 126 and the second electrode lead 127. Therefore, in the secondary battery 100 according to an embodiment of the present invention, since the pouch 110 includes at least one alignment protrusion 130 on a lateral face 112b of the main body 112, and the electrode assembly 120 includes at least one alignment indentation 140 at its edge, alignment of the first electrode 121, the second electrode 122 and the separator 123 of the electrode assembly 120 can be easily achieved.

Figure 2A:
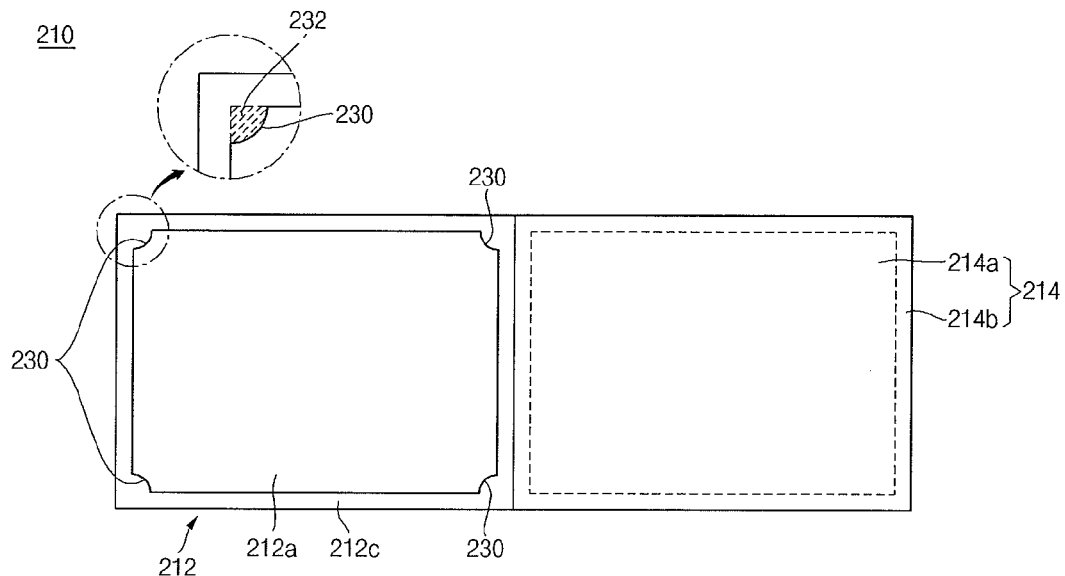
FIGS. 2A and 2B illustrate a pouch and an electrode assembly as component members of a secondary battery according to another embodiment of the present invention.
Figure 2B:
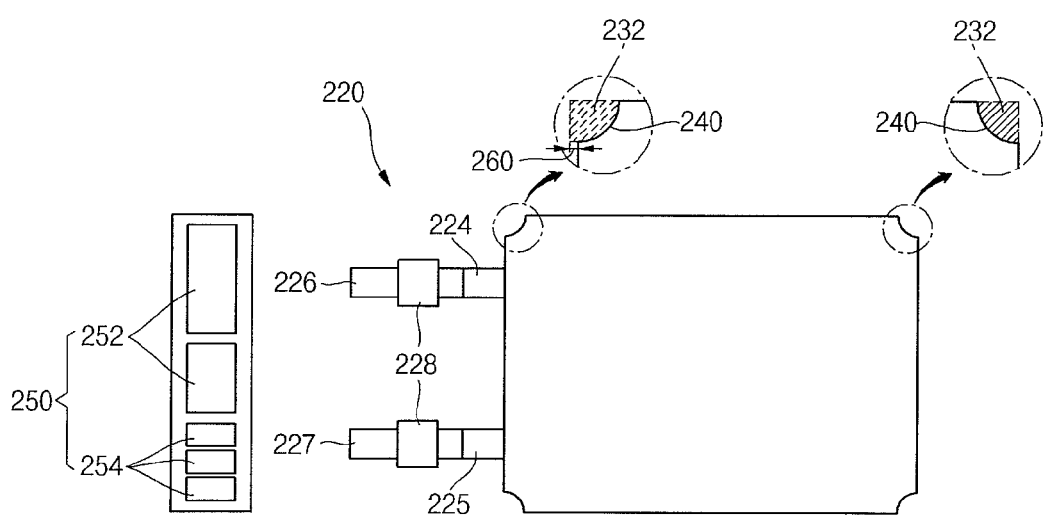

FIGS. 2A and 2B illustrate a pouch 210 and an electrode assembly 230 according to another embodiment of the present invention. In the shown embodiment, the pouch 210 and the electrode assembly 220 are shown in separate drawings, for a better understanding of the invention. It is to be understood that the pouch 210 and the electrode assembly 220 are assembled with the secondary battery 100 of FIG. 1A.

The pouch 210 includes a plurality of alignment protrusions 230. Each protrusion 230 has a fan-shape 232 (hatching regions in FIGS. 2A and 2B). The electrode assembly 220 includes a plurality of alignment indentations 240. In addition, the electrode assembly 220 is connected to a protective circuit module 250.

The pouch 210 includes a main body 212 and a cover 214. In the pouch 210, the main body 212 and the cover 214 correspond to the main body 112 and the cover 114, respectively, which have previously been described with reference to FIGS. 1A through 1C. Each of the plurality of alignment protrusions 230 correspond to the alignment protrusion 130, which have previously been described with reference to FIG. 1B. Accordingly, a detailed description of these elements will not be given herein.

The electrode assembly 220 includes a first electrode (not shown), a second electrode (not shown), a separator (not shown), a first electrode tab 224, a second electrode tab 225, a first electrode lead 226, a second electrode lead 227 and an insulating tape 228, and these elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 220 includes a first electrode tab 224 and a second electrode tab 225 which extend from one lateral face of the electrode assembly 220. Since the electrode assembly 220 includes at least one stack of a first electrode (not shown) and a second electrode (not shown), a plurality of first electrode tabs 224 and a plurality of second electrode tabs 225 are provided in the electrode assembly 220 accordingly. In addition, the electrode assembly 220 includes a first electrode lead 226 connected to the respective first electrode tabs 224 and the second electrode lead 227 connected to the respective second electrode tabs 225.

Here, some of the first electrode tabs 224 and the second electrode tabs 225 connected to the first and second electrode lead 226 and 227 are accommodated in a tab accommodating space 260 between one face of the electrode assembly 220 and the main body 212.

The tab accommodating space 260 is provided by making a width of the electrode assembly 220 smaller than that of a cavity 216. The tab accommodating space 260 may be selected among the alignment indentation 240 provided in the tab accommodating space 260, specifically alignment indentations positioned on one face of the electrode assembly 220, the alignment indentations each having a smaller arc length than that of each of the alignment indentations 240 positioned on the other face of the electrode assembly 220.

Therefore, the electrode assembly 220 has one face that is not brought into contact with a lateral surface of the main body 212 and the other face that is brought into contact with the lateral face of the main body 212. The one face is a face from which the first electrode tabs 224 and the second electrode tabs 225 extend. The other face is not a face from which the first electrode tabs 224 and the second electrode tabs 225 extend.

The protective circuit module 250 includes control devices 252 and external terminals 254. The protective circuit module 250 is substantially the same as the protective circuit module 150 including the control devices 152 and the external terminals 154, as described above with reference to FIG. 1C. Accordingly, a detailed description of these elements will not be given herein.

Figure 3A:
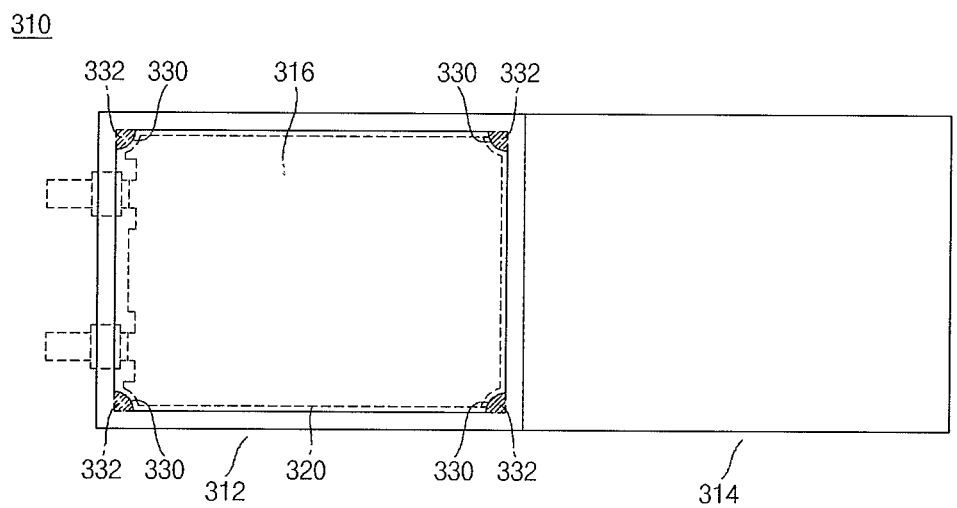
FIGS. 3A and 3B illustrate a pouch and an electrode assembly as component members of a secondary battery according to still another embodiment of the present invention.
Figure 3B:
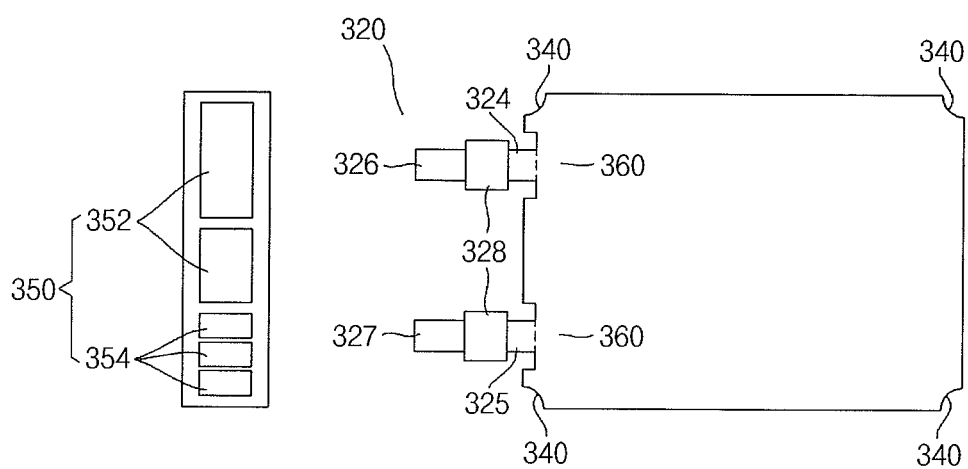

FIGS. 3A and 3B illustrate a pouch 310 and an electrode assembly 320 according to still another embodiment of the present invention. In the shown embodiment, the pouch 310 and the electrode assembly 320 are shown in separate drawings, for a better understanding of the invention. It is to be understood that the pouch 310 and the electrode assembly 320 are assembled with the secondary battery 100 of FIG. 1A.

Referring to FIGS. 3A and 3B, the pouch 310 includes a plurality of alignment protrusions 330. Each protrusion 330 has a fan-shape 332 (hatching regions in FIGS. 3A and 3B). The electrode assembly 320 includes a plurality of alignment indentations 340.

The pouch 310 includes a main body 312 and a cover 314. The pouch 310, the main body 312 and the cover 314 correspond to the main body 112 and the cover 114, respectively, which have previously been described with reference to FIGS. 1A through 1C, and each of the plurality of alignment protrusions 330 corresponds to the alignment protrusion 130, which has previously been described with reference to FIG. 1B. Accordingly, a detailed description of these elements will not be given herein.

The electrode assembly 320 includes a first electrode (not shown), a second electrode (not shown), a separator (not shown), a first electrode tab 324, a second electrode tab 325, a first electrode lead 326, a second electrode lead 327 and an insulating tape 328, and these elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 320 includes a first electrode tab 324 and a second electrode tab 325 which extend from one lateral face of the electrode assembly 320. The electrode assembly 320 is connected to a protective circuit module 350.

Since the electrode assembly 320 includes at least one stack of a first electrode (not shown) and a second electrode (not shown), each of the first electrode tab and the second electrode tab provided in the electrode assembly 320 may include a plurality of first electrode tabs and a plurality of second electrode tabs accordingly. In addition, the electrode assembly 320 includes a first electrode lead 326 connected to the respective first electrode tabs 324 and the second electrode lead 327 connected to the respective second electrode tabs 325.

Here, some of the first electrode tabs 324 and the second electrode tabs 325 connected to the first and second electrode lead 326 and 327 are accommodated in the cavity 316.

The electrode assembly 320 includes tab grooves 360 on one of its faces to accommodate some of the first electrode tabs 324 and the second electrode tabs 325, the one face is a face from which the first electrode tabs 324 and the second electrode tabs 325 extend.

In other words, the tab grooves 360 are included in each of first electrodes and second electrodes constituting the electrode assembly 320, and the first electrode tabs 324 and the second electrode tabs 325 extend from the tab grooves 360, so that some of the first electrode tabs 324 and the second electrode tabs 325 are accommodated in the tab grooves 360.

The protective circuit module 350 includes control devices 352 and external terminals 354. The protective circuit module 350 are substantially the same as the protective circuit module 150 including the control devices 152 and the external terminals 154, as described above with reference to FIG. 1C. Accordingly, a detailed description of these elements will not be given herein.

Figure 4:
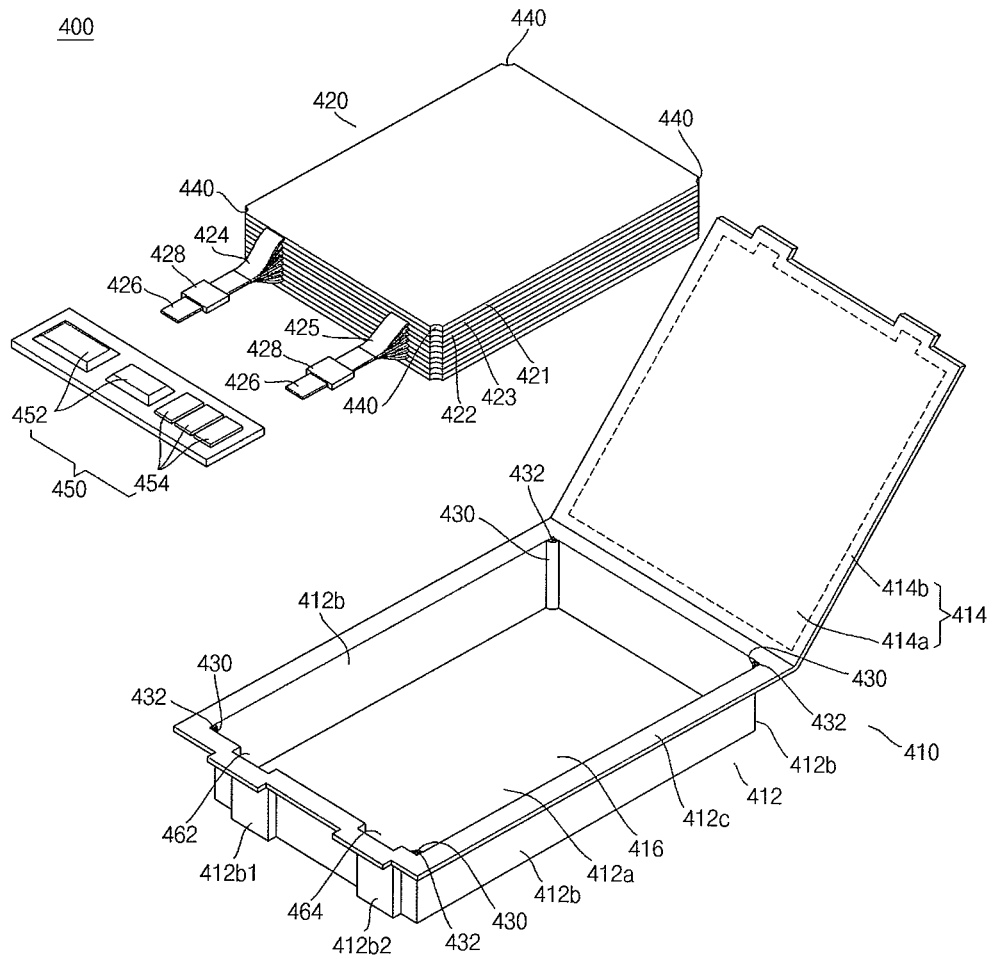
FIG. 4 illustrates a secondary battery according to still another embodiment of the present invention.

FIG. 4 illustrates a secondary battery 400 according to still another embodiment of the present invention. Referring to FIG. 4, the secondary battery 400 includes a pouch 410 and an electrode assembly 420. The secondary battery 400 further includes an electrolyte, which can be of a liquid, gel or solid type electrolyte.

The pouch 410 includes a plurality of alignment protrusions 430. Each protrusion 320 has a fan-shape 432. The electrode assembly 420 includes a plurality of alignment indentations 440. In addition, the secondary battery 400 includes a protective circuit module 450.

The pouch 410 includes a main body 412 including a bottom face 412a, lateral faces 412b and a sealing part 412c. The pouch 410 also includes a lid area and a cover 414. In the pouch 410, the main body 412 and the cover 414 correspond to the main body 112 and the cover 114, respectively, which have previously been described with reference to FIGS. 1A through 1C, and each of the plurality of alignment protrusions 430 corresponds to the alignment protrusion 130, which has previously been described with reference to FIG. 1B. Accordingly, a detailed description of these elements will not be given herein.

The electrode assembly 420 includes a first electrode 421, a second electrode 422, a separator 423, a first electrode tab 424, a second electrode tab 425, a first electrode lead 426, a second electrode lead 427 and an insulating tape 428. These elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 420 includes a first electrode tab 424 and a second electrode tab 425 which extend from one lateral face of the electrode assembly 420. Since the electrode assembly 420 includes at least one stack of the first electrode 421 and the second electrode 422, each of the first electrode tabs 424 and the second electrode tabs 425 provided in the electrode assembly 420 include a plurality of first electrode tabs and a plurality of second electrode tabs accordingly. The plurality of first electrode tabs 424 and the plurality of second electrode tabs 425 are connected to a first electrode lead 426 and a second electrode lead 427, respectively.

As shown, some of the first electrode tabs 424 and the second electrode tabs 425 connected to the first and second electrode lead 426 and 427 are accommodated in a first tab cavity 462 and a second tab cavity 464, respectively.

The first tab cavity 462 is formed such that among the lateral faces 412b of the main body 412, a lateral face 412b1 corresponding to the first electrode tab 424 of the electrode assembly 420 is made to protrude outward. The second tab cavity 464 is formed such that among the lateral faces 412b of the main body 412, a lateral face 412b2 corresponding to the second electrode tab 425 of the electrode assembly 420 is made to protrude outward.

The first and second tab cavities 462 and 464 are spaces from the cavity 416 that are enlarged such that portions 412b1, 412b2 of the lateral faces 412 protrude outward.

The protective circuit module 450 includes control devices 452 and external terminals 454. The protective circuit module 450 are substantially the same as the protective circuit module 150 including the control devices 152 and the external terminals 154, as described above with reference to FIG. 1C. Accordingly, a detailed description of these elements will not be given herein.

Figure 5A:
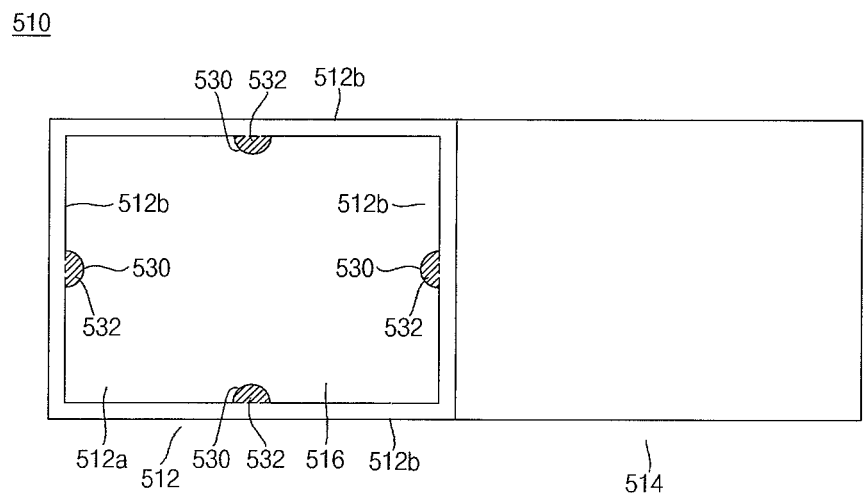
FIGS. 5A and 5B illustrate a pouch and an electrode assembly as component members of a secondary battery according to still another embodiment of the present invention.
Figure 5B:
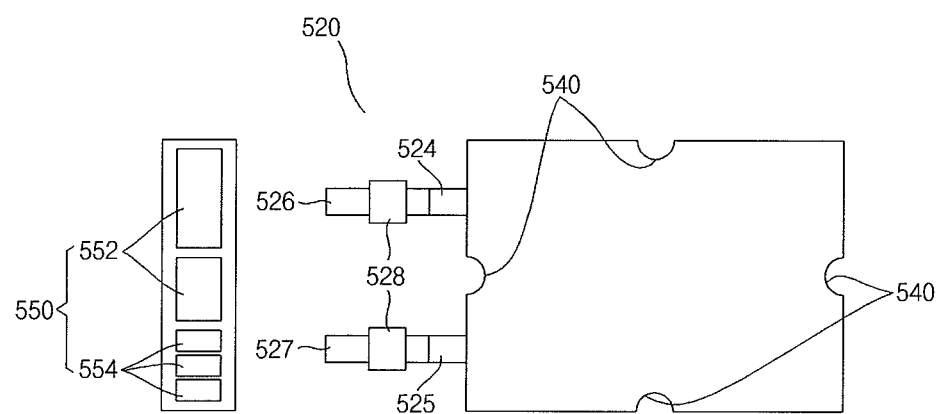

FIGS. 5A and 5B illustrate a pouch 510 and an electrode assembly 520 according to still another embodiment of the present invention. In the current embodiment, the pouch 510 and the electrode assembly 520 are shown in separate drawings, which is, for a better understanding of the invention. However, it is to be understood that the pouch 510 and the electrode assembly 520 are assembled with the secondary battery 100 of FIG. 1A.

The pouch 510 includes a main body 512 and a cover 514. In the pouch 510, the main body 512 and the cover 514 correspond to the main body 112 and the cover 114, respectively, which have previously been described with reference to FIGS. 1A through 1C. Accordingly, a detailed description of these elements will not be given herein.

The main body 512 includes a plurality of alignment protrusions 530. Each of the plurality of alignment protrusions 530 is provided at the lateral faces 512b of the main body 512 to have a hemispherical (semicircular) horizontal section 532 (hatching regions in FIG. 5A). This shape is unlike the alignment protrusion 130 provided at the corner of the lateral face 112b and having a fan-shaped horizontal section, as indicated by a hatching region 132, as described above with reference to FIG. 1B.

Although FIG. 5A illustrates that the alignment protrusions 530 are provided at all the four lateral faces 512b of the main body 512, the invention is not limited to the illustrated example. Rather, two alignment protrusions 530 may be provided at a first lateral face of the electrode assembly 520 from which the first electrode tabs 524 and the second electrode tabs 525 extend, and at a second lateral face of the electrode assembly 520, the second lateral face being opposite to and facing the one lateral face of the electrode assembly 520. However, it is understood that the alignment protrusions 530 may be disposed in the different lateral faces 512b of the main body in different quantities, or in some cases, the alignment protrusions 530 may be disposed in some of the lateral faces 5112b of the main body 512 will not being disposed in other lateral faces of the main body 512.

The electrode assembly 520 includes a first electrode (not shown), a second electrode (not shown), a separator (not shown), a first electrode tab 524, a second electrode tab 525, a first electrode lead 526, a second electrode lead 527 and an insulating tape 528, and these elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 520 includes at least one alignment indentation 540 formed at its edge, the at least one alignment indentation 540 corresponds to the protrusions 530.

As show in FIG. 5B, the at least one alignment indentation 540 is provided at all of four sides. Alternatively, the at least one alignment indentation 540 may be formed at an edge of a first lateral face of the electrode assembly 520 from which the first electrode tabs 524 and the second electrode tabs 525 extend, and at an edge of a second lateral face of the electrode assembly 520, the second lateral face being opposite to and facing the one lateral face of the electrode assembly 520. However, it is understood that the alignment indentations 540 may be disposed in the different lateral faces of the electrode assembly 520 in different quantities, or in some cases, the alignment indentations 540 may be disposed in some of the lateral faces of the electrode assembly 520 will not being disposed in other lateral faces of the electrode assembly 520.

The protective circuit module 550 includes control devices 552 and external terminals 554. The protective circuit module 550 are substantially the same as the protective circuit module 150 including the control devices 152 and the external terminals 154, as described above with reference to FIG. 1C. Accordingly, a detailed description of these elements will not be given herein.

Figure 6A:
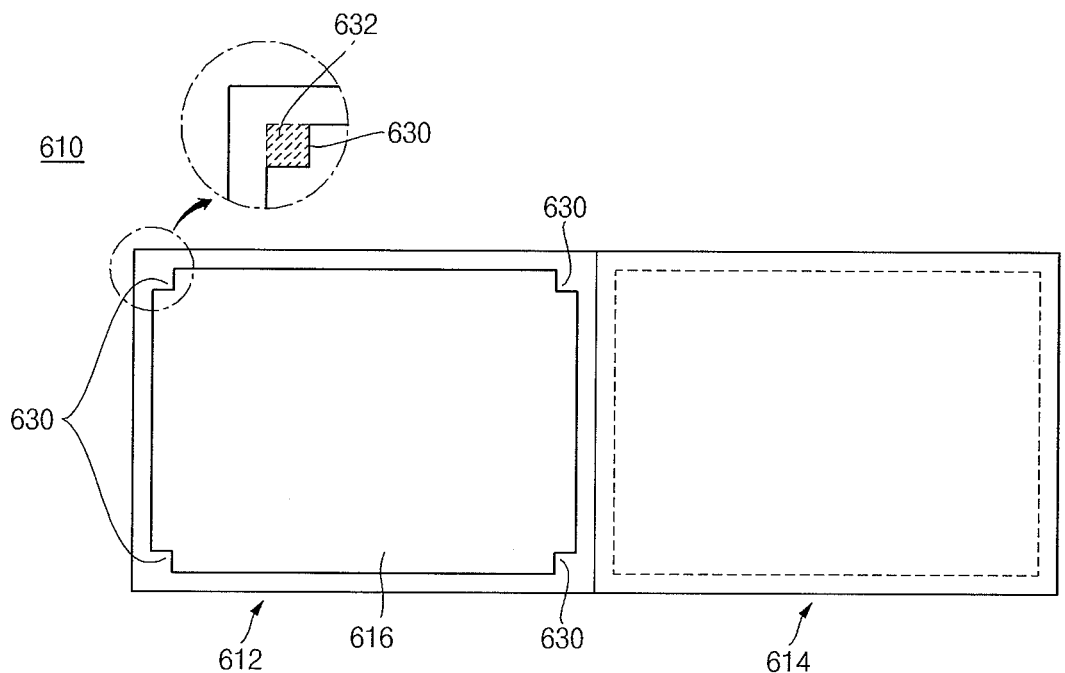
FIGS. 6A and 6B illustrate a pouch and an electrode assembly as component members of a secondary battery according to still another embodiment of the present invention.
Figure 6B:
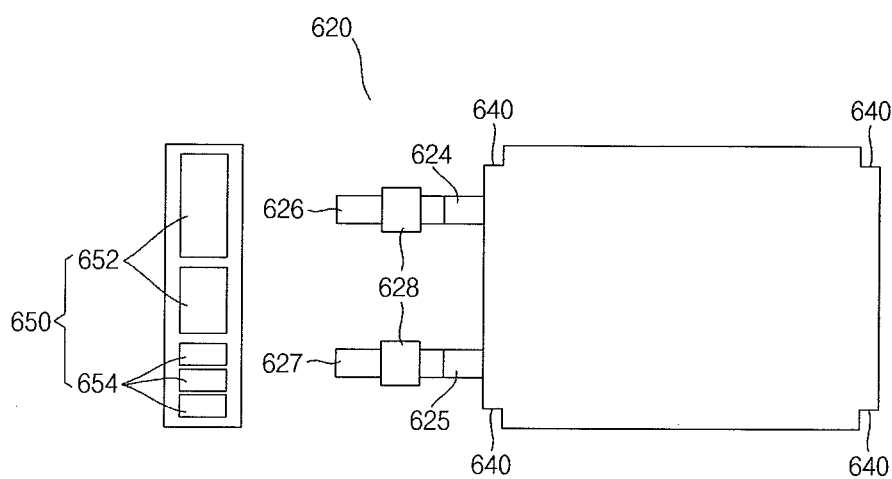

FIGS. 6A and 6B illustrate a pouch 610 and an electrode assembly 620 according to still another embodiment of the present invention. In the current embodiment, the pouch 610 and the electrode assembly 620 are shown in separate drawings, for a better understanding of the invention. It is to be understood that the pouch and the electrode assembly are assembled with the secondary battery 100 of FIG. 1A.

The pouch 610 includes a main body 612 and a cover 614. In the pouch 610, the main body 612 and the cover 614 correspond to the main body 112 and the cover 114, respectively, which have previously been described with reference to FIGS. 1A through 1C. Accordingly, a detailed description of these elements will not be given herein.

The main body 612 includes a plurality of alignment protrusions 630. Each of the plurality of alignment protrusions 630 is provided at the lateral faces 612b of the main body 612 to have a horizontal section shaped like a rectangle 632 (hatching regions in FIG. 6A) in which the corner of the rectangle 632 is directed toward the interior of a cavity 616. The shape is unlike the alignment protrusion 130 having a fan shaped horizontal section as described above with reference to the hatching region 132 in FIG. 1B.

The electrode assembly 620 includes a first electrode (not shown), a second electrode (not shown), a separator (not shown), a first electrode tab 624, a second electrode tab 625, a first electrode lead 626, a second electrode lead 627 and an insulating tape 628. These elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 620 includes at least one alignment indentation 640 formed at its edge. The at least one alignment indentation 640 corresponds to the at least one protrusion 630 formed on the main body 612 of the pouch 610. In addition, the at least one alignment indentation 640 is formed to have a shape complementing that of the at least one protrusion 630.

Also shown in FIG. 6B is a protective circuit module 650. The protective circuit module 650 includes control devices 652 and external terminals 654. The protective circuit module 650 is substantially the same as the protective circuit module 150 including the control devices 152 and the external terminals 154, as described above with reference to FIG. 1C. Accordingly, a detailed description of these elements will not be given herein.

Figure 7A:
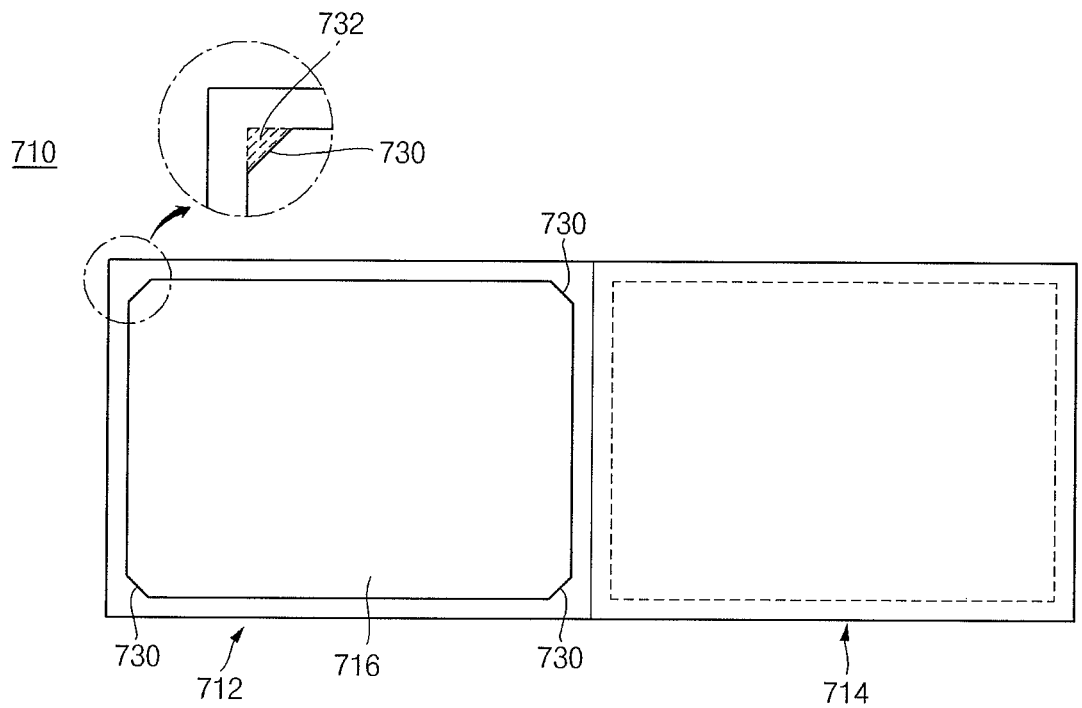
FIGS. 7A and 7B illustrate a pouch and an electrode assembly as component members of a secondary battery according to another embodiment of the present invention.
Figure 7B:
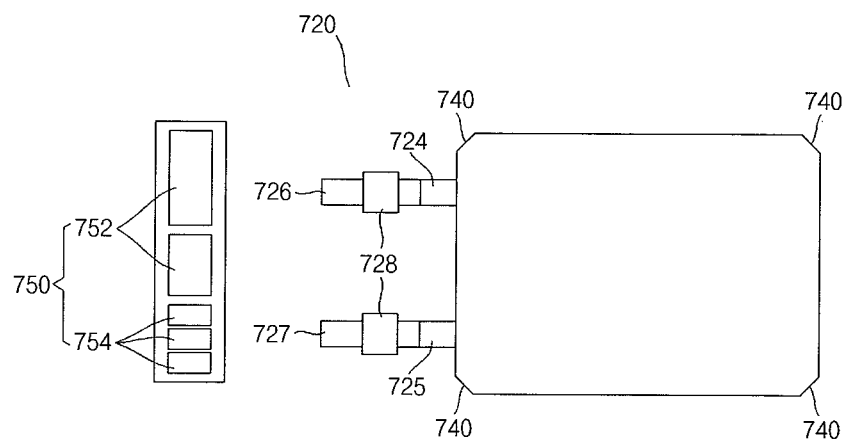

FIGS. 7A and 7B illustrate a pouch 710 and an electrode assembly 720 according to another embodiment of the present invention. In the current embodiment, the pouch 710 and the electrode assembly 720 are shown in separate drawings, for a better understanding of the invention. However, it is to be understood that the pouch 710 and the electrode assembly 720 are assembled with the secondary battery 100 of FIG. 1A.

The pouch 710 includes a main body 712 and a cover 714. In the pouch 710, the main body 712 and the cover 714 correspond to the main body 112 and the cover 114, respectively, which have previously been described with reference to FIGS. 1A through 1C. Accordingly, a detailed description of these elements will not be given herein.

The main body 712 includes at least one alignment protrusion 730. Unlike the alignment protrusion 130 provided at the corner of the lateral face 112b and having a fan-shaped horizontal section (shown in the hatched regions 132 in FIG. 1B), each of the plurality of alignment protrusions 730 has a horizontal section shaped like a triangle 532 (hatching regions in FIG. 7A) and an inclined surface directed toward a cavity 716.

The electrode assembly 720 includes a first electrode (not shown), a second electrode (not shown), a separator (not shown), a first electrode tab 724, a second electrode tab 725, a first electrode lead 726, a second electrode lead 727 and an insulating tape 728. These elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 720 includes at least one alignment indentation 740 formed at its edge, the at least one alignment indentation 740 corresponding to the at least one alignment protrusion 730.

In addition, the at least one alignment indentation 740 is formed in a shape so that each corner of the electrode assembly 720 corresponds to the at least one protrusion 730.

Also shown in FIG. 7B is a protective circuit module 750. The protective circuit module 750 includes control devices 752 and external terminals 754. The protective circuit module 750 is substantially the same as the protective circuit module 150 including the control devices 152 and the external terminals 154, as described above with reference to FIG. 1C. Accordingly, a detailed description of these elements will not be given herein.

Figure 8:
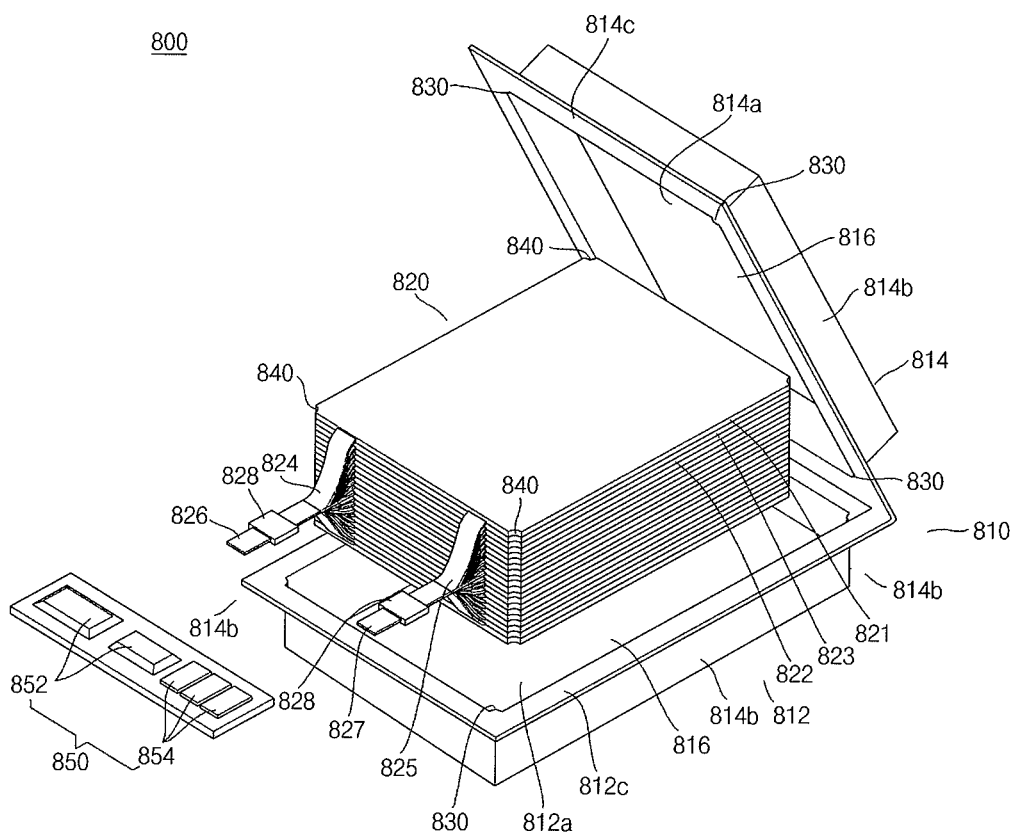
FIG. 8 illustrates a secondary battery according to still another embodiment of the present invention.

FIG. 8 illustrates a secondary battery 800 according to still another embodiment of the present invention. Referring to FIG. 8, the secondary battery 800 according to still another embodiment of the present invention includes the pouch 810 and an electrode assembly 820. In addition, the secondary battery 800 includes a protective circuit module 850. The secondary battery 800 further includes an electrolyte, which can be of a liquid, gel or solid type electrolyte.

The pouch 810 includes a main body 812 and a cover 814. The main body 812 has a structure corresponding to that of the main body 112, which has previously been described with reference to FIGS. 1A through 1C. The main body 812 has a bottom face 812a, lateral faces 812b and a sealing part 812c, which correspond to the bottom face 112a, the lateral faces 112b and the sealing part 112c shown in FIGS. 1A through 1C.

The cover 814 is different from the cover 114 shown in FIGS. 1A through 1C. That is to say, as shown in FIG. 8, the cover 814 is symmetric to the main body 812, unlike the flat cover 114 shown in FIG. 1.

In such a manner, the secondary battery 800 is provided with a cavity 816 on the main body 812 and another cavity 816 on the cover 814, thereby obtaining the double-capacity cavity 816, compared to the cavity 116 of the secondary battery 100 shown in FIGS. 1A through 1C.

Each of the main body 812 and the cover 814 include a plurality of alignment protrusions 830. The alignment protrusions 830 provided in the main body 812 are symmetrical to those 830 provided in the cover 814. Since the alignment protrusions 830 are provided to correspond to the alignment protrusions 130 shown in FIGS. 1A through 1C, a detailed description thereof will not be given herein.

Various component members of the electrode assembly 820 correspond to those of the electrode assembly 120 shown in FIGS. 1A through 1C. However, a thickness of the electrode assembly 820 is increased to be adapted for the cavity 816. That is, the electrode assembly 820 includes a first electrode (not shown), a second electrode (not shown), a separator (not shown), a first electrode tab 824, a second electrode tab 825, a first electrode lead 826, a second electrode lead 827 and an insulating tape 828, and these elements correspond to the first electrode 121, the second electrode 122, the separator 123, the first electrode tab 124, the second electrode tab 125, the first electrode lead 126, the second electrode lead 127 and the insulating tape 128, respectively, which have previously been described with reference to FIGS. 1A through 1C. Accordingly, a detailed description of these elements will not be given herein.

The electrode assembly 820 includes at least one alignment indentation 840, which corresponds to the at least one alignment indentation shown in FIGS. 1A through 1C, and a detailed description thereof will not be given herein.

The protective circuit module 850 includes control devices 852 and external terminals 854. The protective circuit module 850 is substantially the same as the protective circuit module 150 including the control devices 152 and the external terminals 154, as described above with reference to FIGS. 1A through 1C. Accordingly, a detailed description of these elements will not be given herein.

Figure 9A:
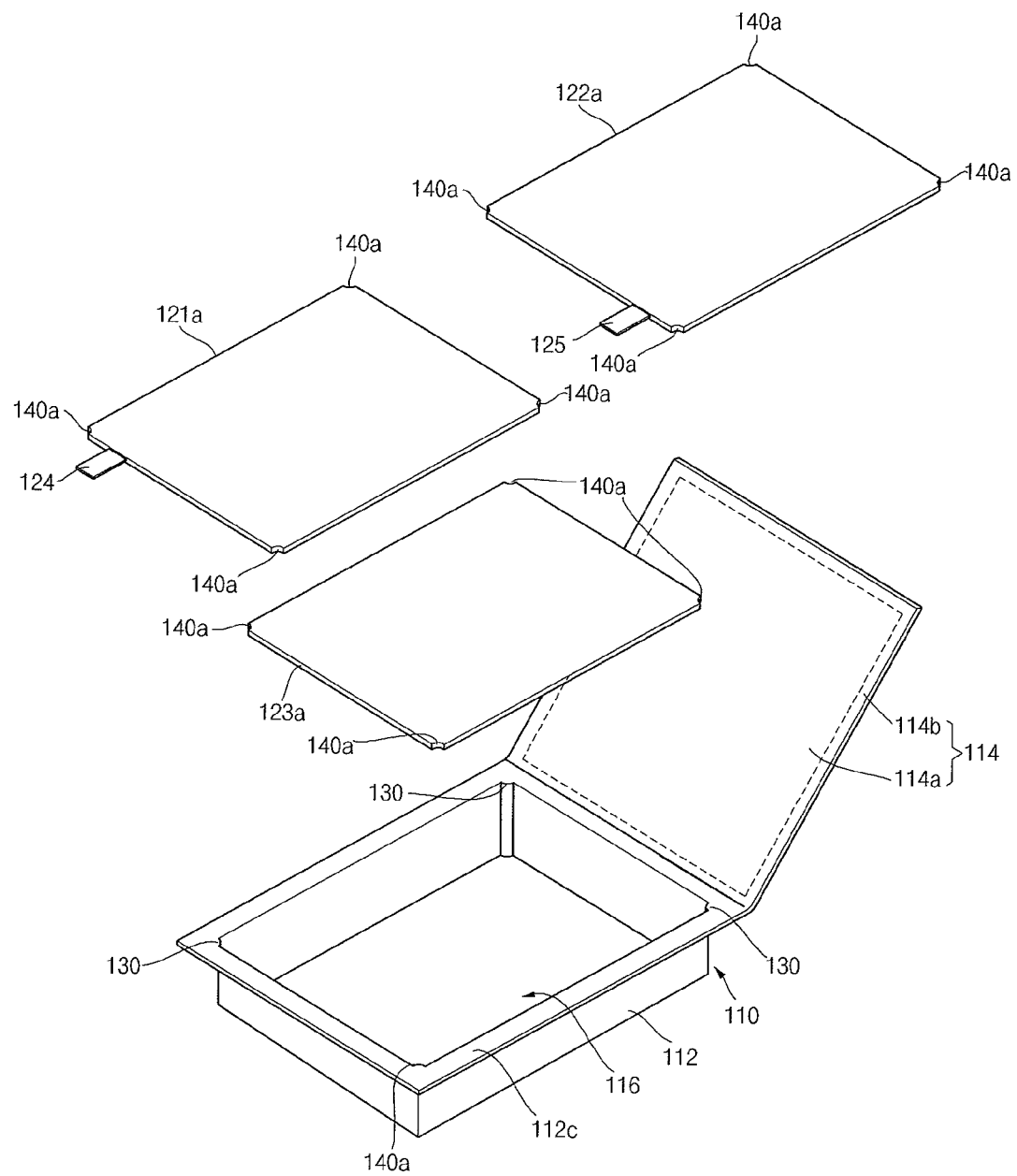
FIGS. 9A through 9C illustrate a method for manufacturing a secondary battery according to an embodiment of the present invention.
Figure 9B:
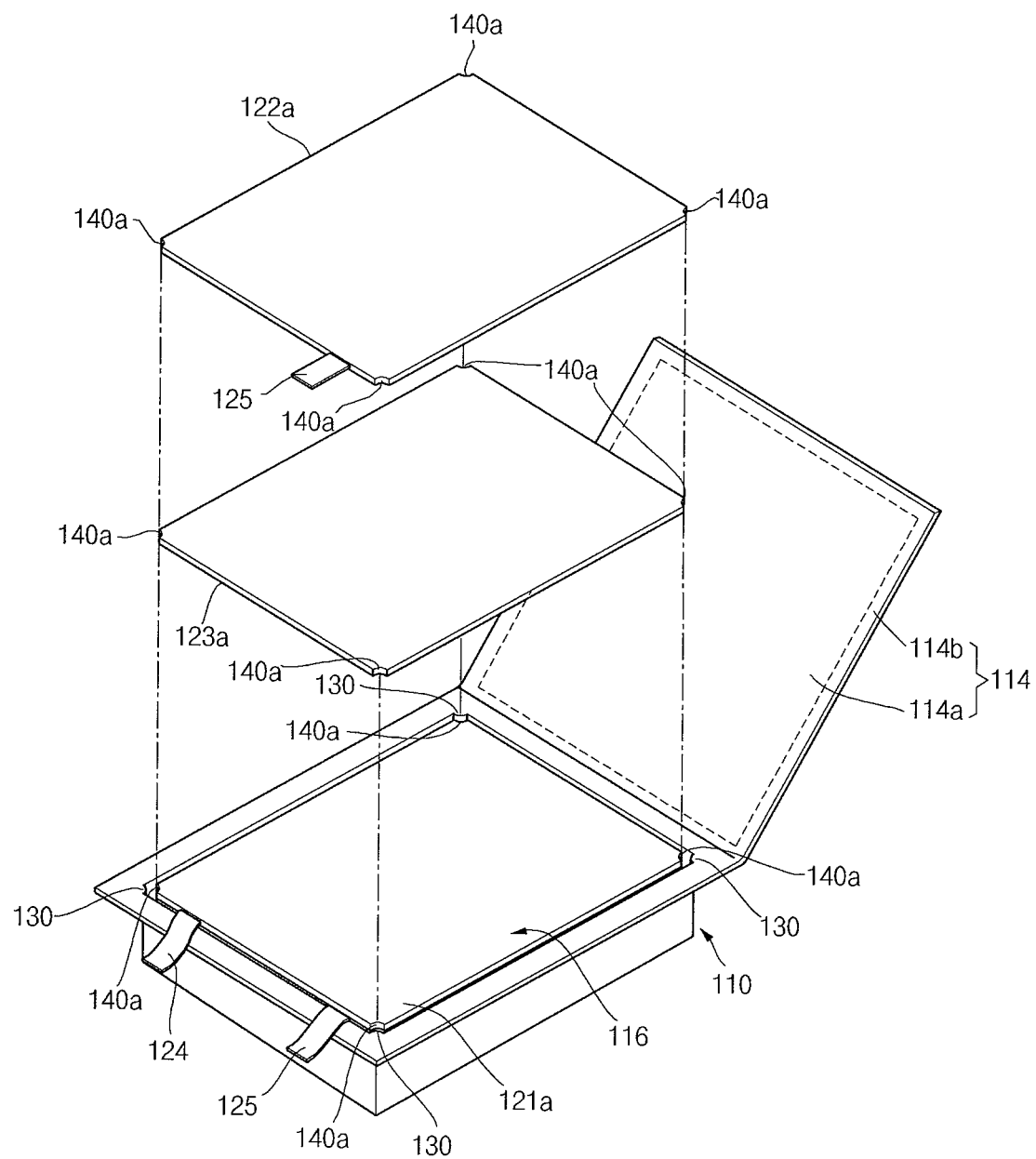
Figure 9C:
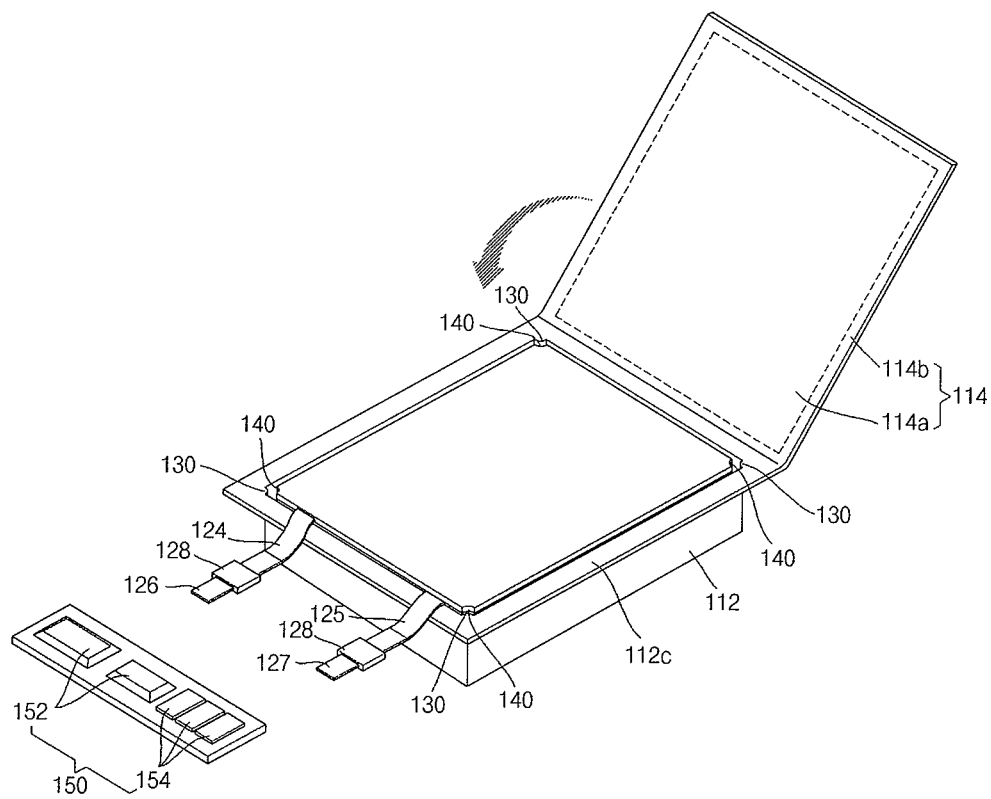

FIGS. 9A through 9C illustrate a method for manufacturing a secondary battery according to an embodiment of the present invention. Referring to FIGS. 9A through 9C, the pouch 110 shown in FIG. 1B is first prepared. Here, the pouch 210, 310, 410, 510, 610, 710 or 810 shown in FIG. 2A, 3A, 4A, 5A, 6A, 7A or 8A may also be used, instead of the pouch 110.

Next, the first electrode 121a, the second electrode 122a and the separator 123a shown in FIG. 1D are prepared. Here, the first electrodes, the second electrodes and the separators of the electrode assemblies 220, 320, 420, 520, 620, 720 and 820 shown in FIG. 2A, 3A, 4A, 5A, 6A, 7A or 8A may also be used, instead of the first electrode 121a, the second electrode 122a and the separator 123a, respectively.

The first electrode 121a, the separator 123a and the second electrode 122a are sequentially stacked and accommodated in the cavity 116 of the pouch 110.

The pouch 110 includes a plurality of alignment protrusions 130 and each of the first electrode 121a, the separator 123a and the second electrode 122a include a plurality of alignment indentations 140a. Accordingly, the first electrode 121a, the second electrode 122a and the separator 123a are easily aligned in the cavity 116 of the pouch 110.

When the stacking of the first electrode 121a, the separator 123a and the second electrode 122a is completed in the cavity 116, the first electrode tabs 124 extending from one lateral face of the first electrode 121a and the second electrode tabs 125 extending from one lateral face of the second electrode 122a are connected to the first electrode lead 126 and the second electrode lead 127, respectively. Here, the connecting of the first electrode lead 126 and the second electrode lead 127 is performed by welding, for example, resistance welding.

To protect the first electrode lead 126 and the second electrode lead 127, the insulating tape 128 is formed at a predetermined region of each of the first electrode lead 126 and the second electrode lead 127.

Next, the main body 112 is shielded by the cover 114, followed by fusing the sealing part 112c of the main body 112 with the sealing part 114b of the cover 114, thereby hermetically sealing the cavity 116 of the main body 112.

The protective circuit module 150 is connected to the first electrode lead 126 and the second electrode lead 127, thereby completing the secondary battery according to the illustrated embodiment of the present invention.

Figure 10A:
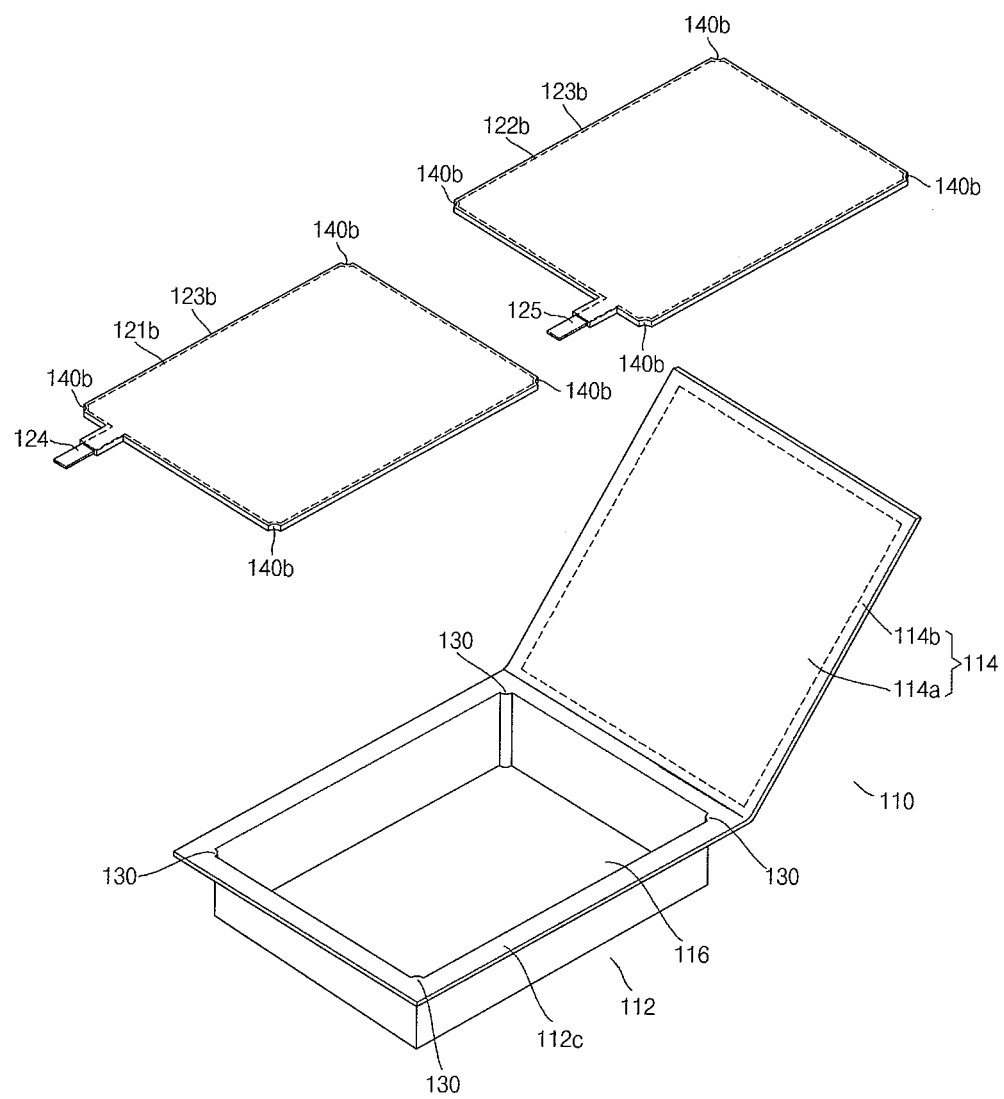
FIGS. 10A through 10C illustrate a method for manufacturing a secondary battery according to still another embodiment of the present invention.
Figure 10B:
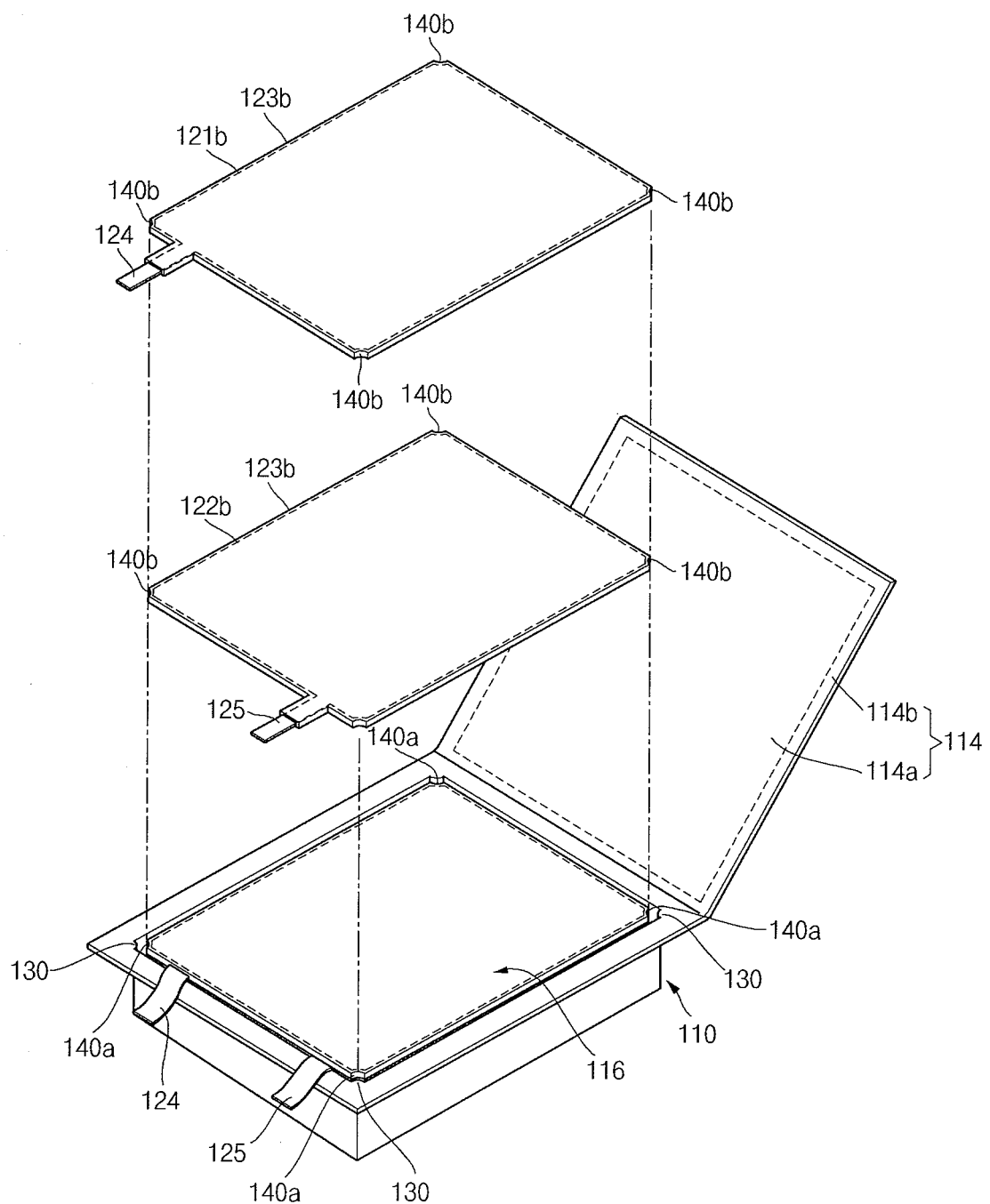
Figure 10C:
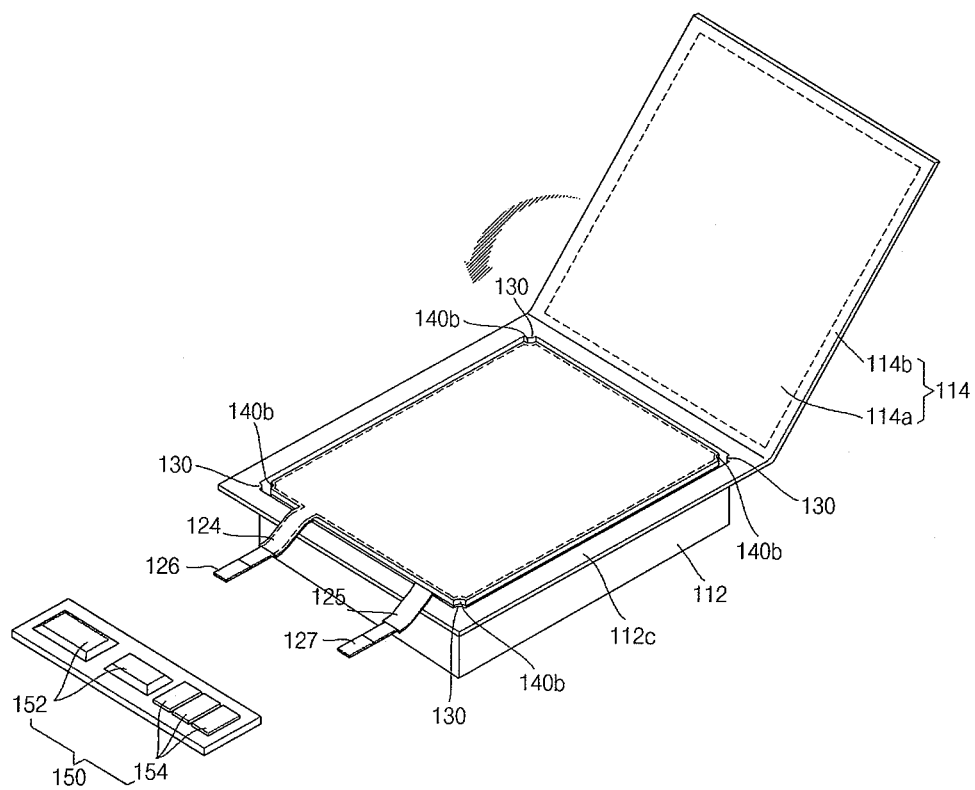

FIGS. 10A through 10C illustrate a method for manufacturing a secondary battery according to still another embodiment of the present invention. Referring to FIGS. 10A through 10C, the pouch 110 shown in FIG. 1B is first prepared.

Here, the pouch 210, 310, 410, 510, 610, 710 or 810 shown in FIG. 2A, 3A, 4A, 5A, 6A, 7A or 8 may also be used, instead of the pouch 110.

Next, the first electrode 121b and the second electrode 122b and the separator 123b shown in FIG. 1E are prepared. Here, the first electrodes and the second electrodes of the electrode assemblies 220, 320, 420, 520, 620, 720 and 820 shown in FIG. 2B, 3B, 4B, 5B, 6B, 7B or 8 may also be used, instead of the first electrode 121b and the second electrode 122b, respectively. Specifically, the first electrode 121b or the second electrode 122b of the electrode assembly 820 includes the insulating-layer separator 123b.

Although FIG. 10A illustrates that both of the first electrode 121b and the second electrode 122b include the insulating-layer separator 123b, the insulating-layer separator 123b may be provided on only one of the first electrode 121b and the second electrode 122b.

Meanwhile, the insulating-layer separator 123b may be provided on the first electrode 121b or the second electrode 122b through a liquid coating method. In detail, the insulating-layer separator 123b is supplied in a slurry or liquid phase. Then, the slurry or liquid phase insulating-layer separator 123b is coated on a surface of the first electrode 121b or the second electrode 122b using the liquid coating method, for example, dipping or spraying.

Subsequently, the first electrode 121b and the second electrode 122b including the insulating-layer separator 123b are sequentially stacked and accommodated in the cavity of the pouch 110.

Here, the pouch 110 includes the plurality of alignment protrusions 130 and each of the first electrode 121b and the second electrode 122b include the plurality of alignment indentations 140b. Accordingly, the first electrode 121b and the second electrode 122b are easily aligned in the cavity 116.

When the stacking of the first electrode 121b and the second electrode 122b is completed in the cavity 116, the first electrode tabs 124 extending from one lateral face of the first electrode 121b and the second electrode tabs 125 extending from one lateral face of the second electrode 122b are connected to the first electrode lead 126 and the second electrode lead 127, respectively. Here, the connecting of the first electrode lead 126 and the second electrode lead 127 is performed by welding, for example, resistance welding.

Here, the forming of the insulating tape (128 of FIG. 9C) in the first electrode lead 126 and the second electrode lead 127 may be omitted. This is because the insulating-layer separator 123b is capable of protecting the first electrode tabs 124 and the second electrode tabs 125 by providing the insulating-layer separator 123b in a predetermined region of each of the first electrode tabs 124 and the second electrode tabs 125.

Next, the main body 112 is covered by the cover 114, followed by fusing the sealing part 112c of the main body 112 with the sealing part 114b of the cover 114, thereby sealing the cavity 116 of the main body 112.

The protective circuit module 150 is connected to the first electrode lead 126 and the second electrode lead 127, thereby completing the secondary battery according to the illustrated embodiment of the present invention.

Figure 11A:
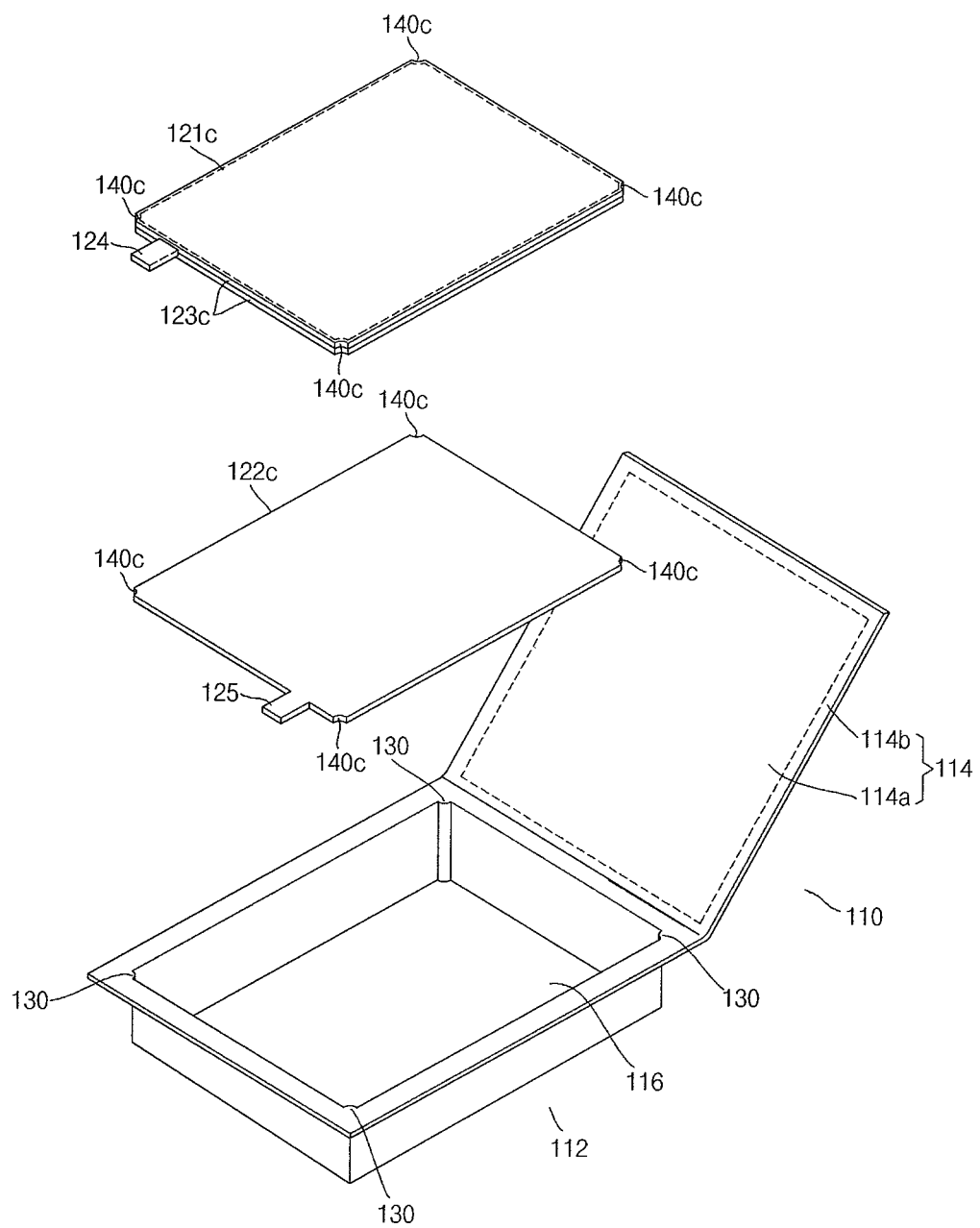
FIGS. 11A through 11C illustrate a method for manufacturing a secondary battery according to still another embodiment of the present invention.
Figure 11B:
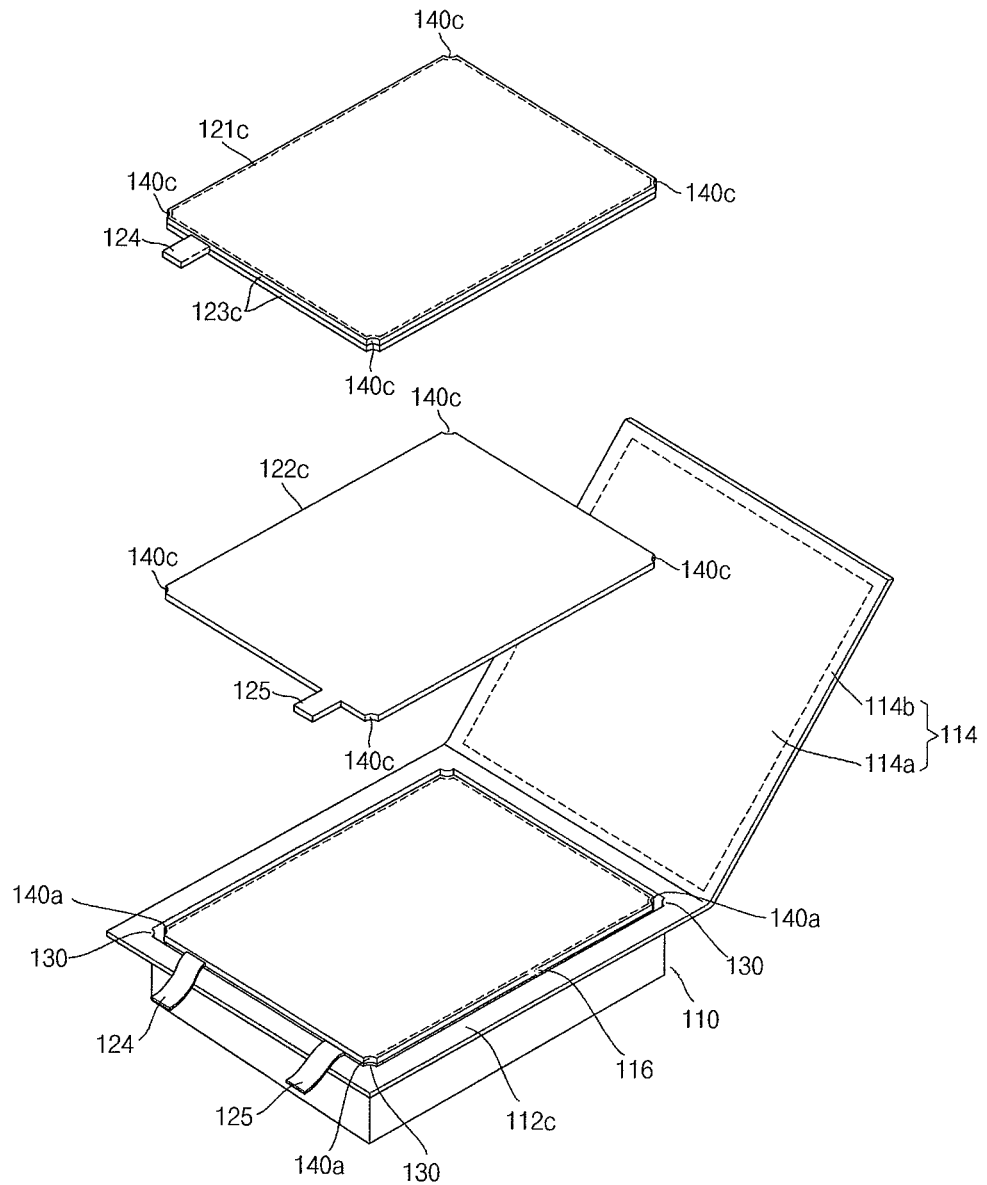
Figure 11C:
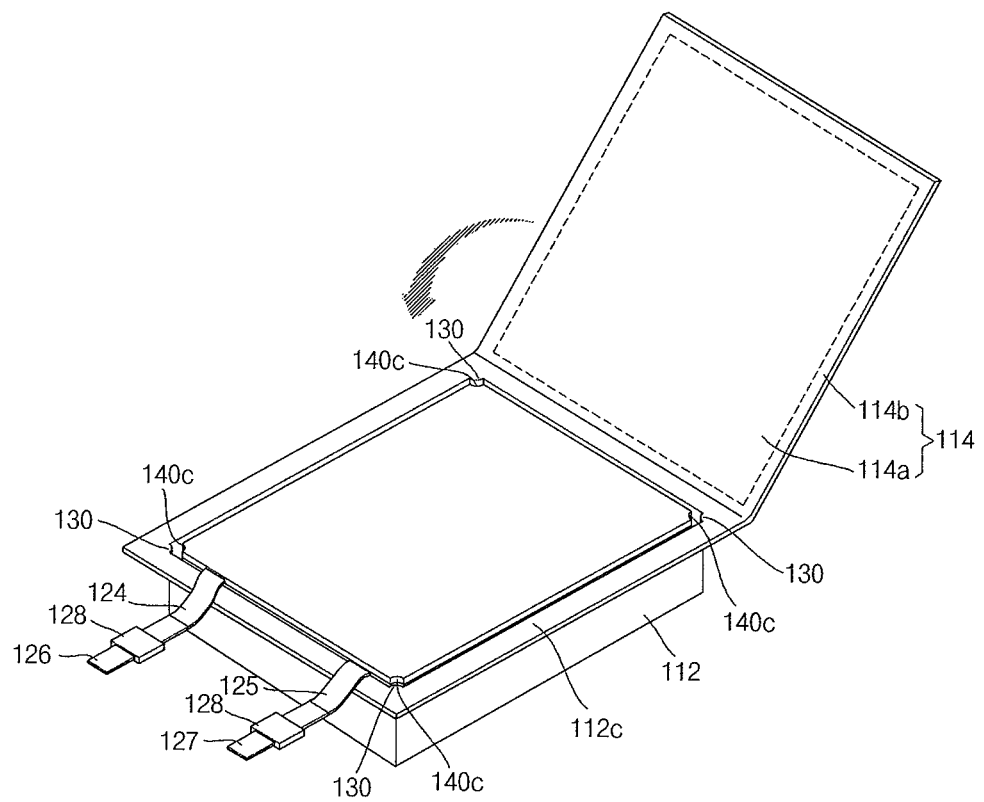

FIGS. 11A through 11C illustrate a method for manufacturing a secondary battery according to still another embodiment of the present invention. Referring to FIGS. 11A through 11C, the pouch 110 shown in FIG. 1B is first prepared.

Here, the pouch 210, 310, 410, 510, 610, 710 or 810 shown in FIG. 2A, 3A, 4A, 5A, 6A, 7A or 8 may also be used, instead of the pouch 110.

Next, the first electrode 121c and the second electrode 122c and the separator 123a shown in FIG. 1F are prepared. Here, the first electrodes and the second electrodes of the electrode assemblies 220, 320, 420, 520, 620, 720 and 820 shown in FIG. 2B, 3B, 4B, 5B, 6B, 7B or 8 may also be used, instead of the first electrode 121b and the second electrode 122b, respectively. Specifically, the first electrode 121b or the second electrode 122b of the electrode assembly 820 includes the two sheets of separators 123c.

Although FIG. 11A illustrates that the first electrode 121c is encapsulated by the two sheets of separators 123c, the invention is not limited thereto. Rather, the second electrode 122b may also be encapsulated by the two sheets of separators 123c.

Meanwhile, the first electrode 121c is encapsulated by the two sheets of separators 123c by fusing edges of the two sheets of separators 123c by ultrasonic fusion or thermal fusion.

Next, the first electrode 121c or the second electrode 122c encapsulated by the two sheets of separators 123c are sequentially stacked and accommodated in the cavity 116 of the pouch 110. Here, since the pouch 110 includes the plurality of alignment protrusions 130 and each of the first electrode 121c and the second electrode 122c include the plurality of alignment indentations 140c, the first electrode 121c and the second electrode 122c are easily aligned in the cavity 116 of the pouch 110.

When the stacking of the first electrode 121c and the second electrode 122c is completed in the cavity 116, the first electrode tabs 124 extending from one lateral face of the first electrode 121c and the second electrode tabs 125 extending from one lateral face of the second electrode 122c are connected to the first electrode lead 126 and the second electrode lead 127, respectively. Here, the connecting of the first electrode lead 126 and the second electrode lead 127 is performed by welding, for example, resistance welding.

To protect the first electrode lead 126 and the second electrode lead 127, the insulating tape 128 is formed at a predetermined region of each of the first electrode lead 126 and the second electrode lead 127.

Next, the main body 112 is covered by the cover 114, followed by fusing the sealing part 112c of the main body 112 with the sealing part 114b of the cover 114, thereby sealing the cavity 116 of the main body 112.

The protective circuit module 150 is connected to the first electrode lead 126 and the second electrode lead 127, thereby completing the secondary battery according to the illustrated embodiment of the present invention.

Figure 12A:
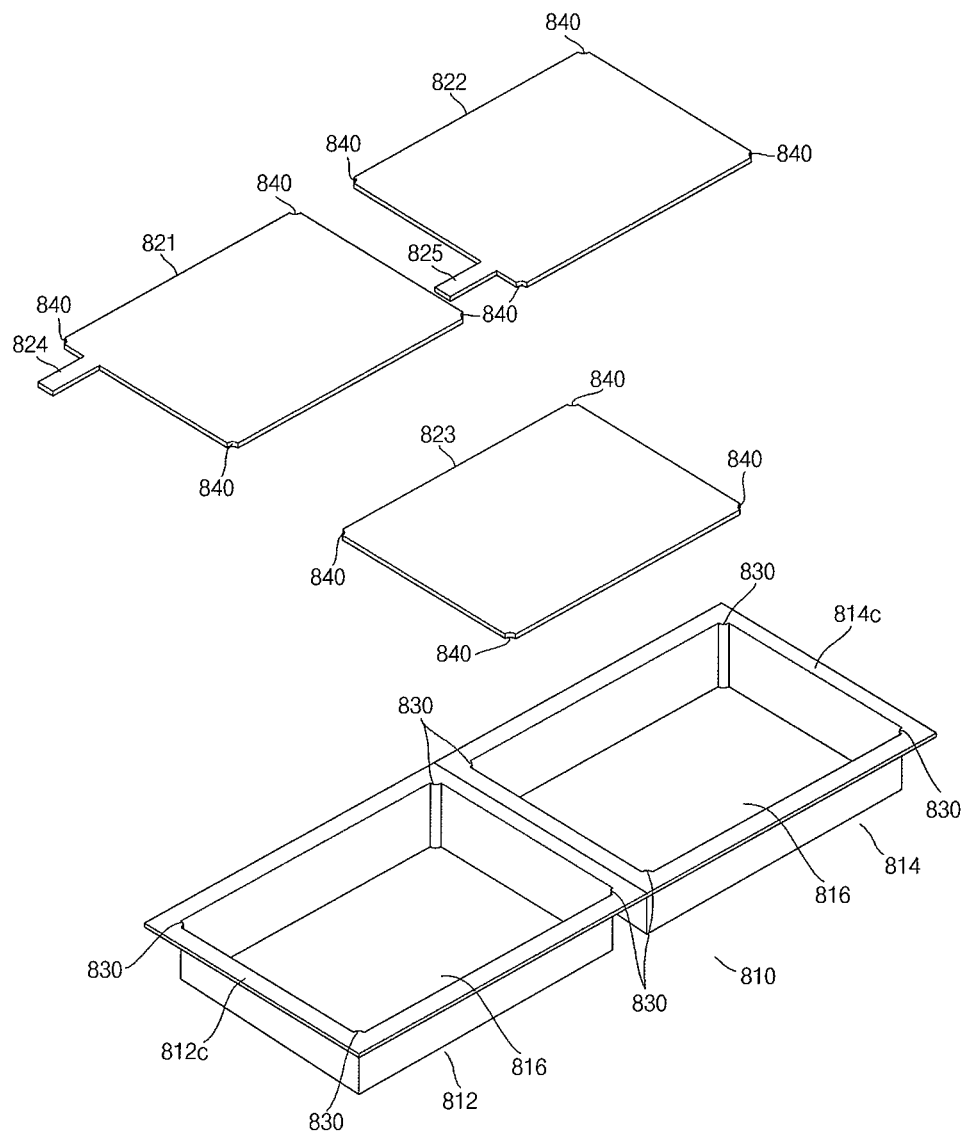
FIGS. 12A through 12C illustrate a method for manufacturing a secondary battery according to still another embodiment of the present invention.
Figure 12B:
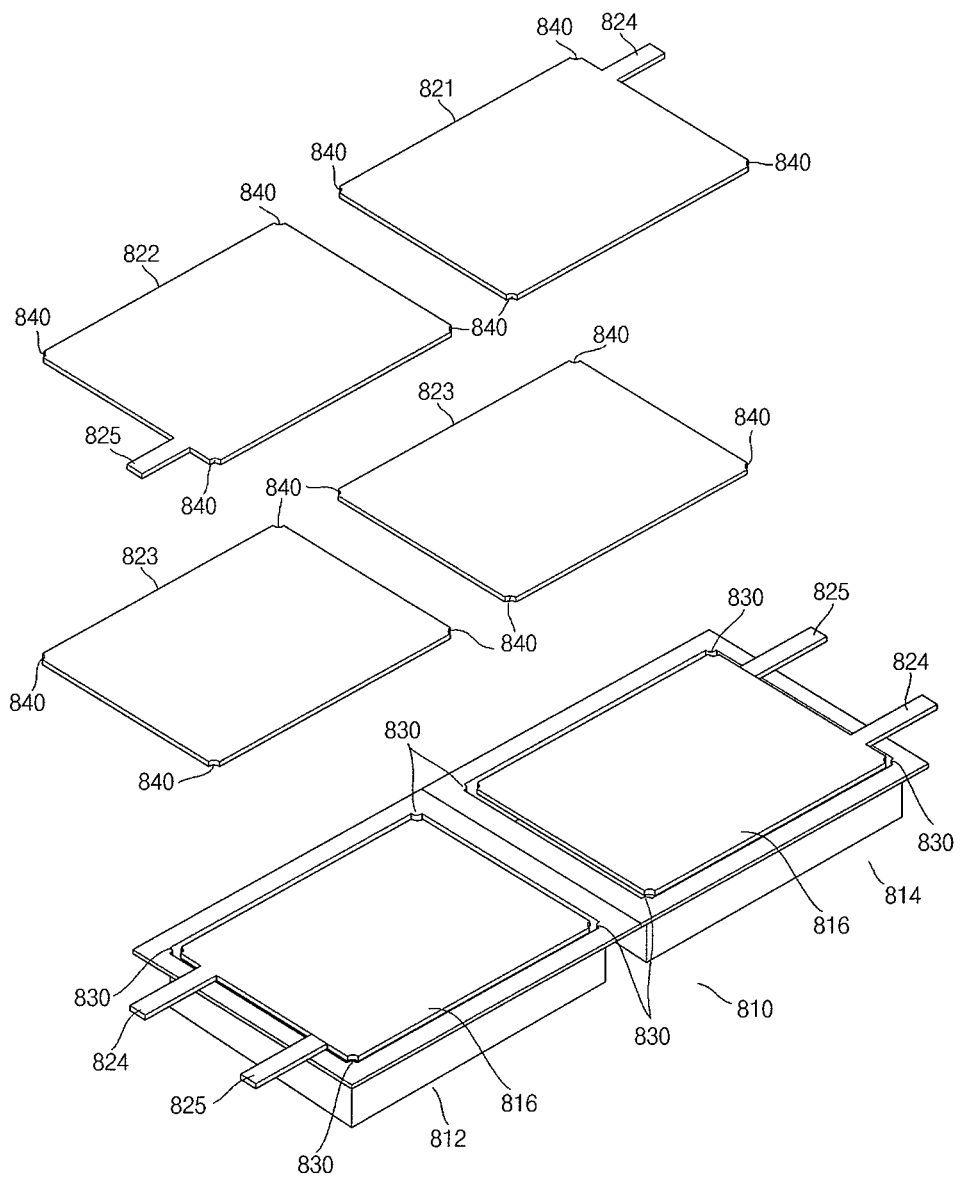
Figure 12C:
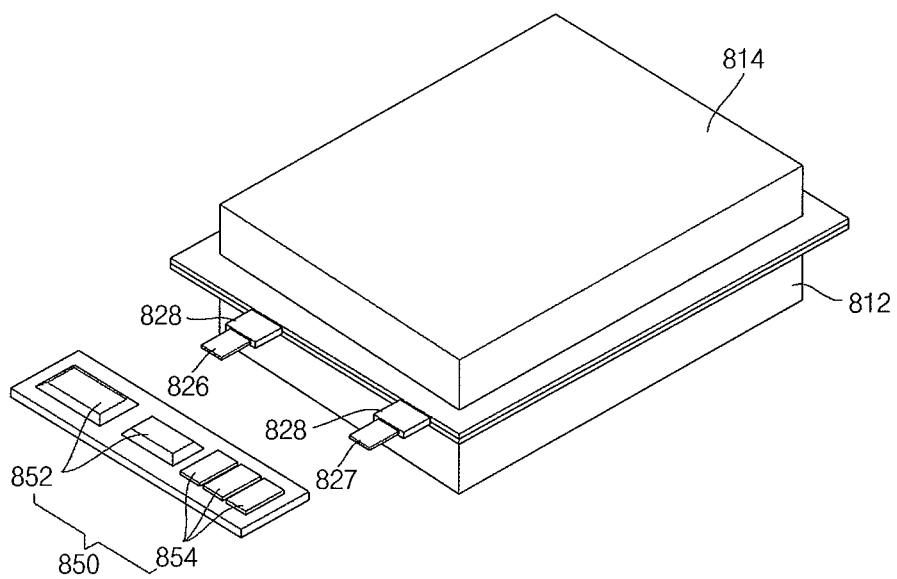

FIGS. 12A through 12C illustrate a method for manufacturing a secondary battery according to still another embodiment of the present invention. Referring to FIGS. 12A through 12C, the pouch 810 shown in FIG. 8 is first prepared. Next, the first electrode 821, the second electrode 822 and the separator 823 are prepared.

Here, the first electrode 121a, the second electrode 122b and the separator 123a shown in FIG. 1D may be used instead of the first electrode 821, the second electrode 822 and the separator 823, respectively. Alternatively, the first electrode 121b and the second electrode 121b including the separator 123b, as shown in FIG. 1E, may be used instead of the first electrode 821, the second electrode 822 and the separator 823, respectively. Alternatively, the first electrode 121b and the second electrode 121b encapsulated by the two sheets of separators 123c, as shown in FIG. 1F, may be used instead of the first electrode 821, the second electrode 822 and the separator 823, respectively.

The first electrodes and the second electrodes of the electrode assemblies 220, 320, 420, 520, 620 or 720 shown in FIG. 2B, 3B, 4B, 5B, 6B or 7B may also be used, instead of the first electrode 821 and the second electrode 822, respectively.

Subsequently, the first electrode 821, the separator 823 and the second electrode 822 are sequentially stacked to then be accommodated in each cavity 816 of the main body 816 and the cover 814 of the pouch 810.

Here, the electrodes finally stacked in the cavities 816 of the main body 812 and the cover 814 have different polarities from each other. This is for making the electrodes finally stacked in the cavities 816 of the main body 812 and the cover 814 become different electrodes when the cavity 816 of the main body 816 is combined with the cavity 816 of the cover 814.

Here, since the pouch 810 includes the plurality of alignment protrusions 830 and each of the first electrode 821 and the second electrode 822 include the plurality of alignment indentations 840, the first electrode 821 and the second electrode 822 are easily aligned in the cavities 816 of the pouch 810.

When the stacking of the first electrode 821, the second electrode 822 and the separator 823 is completed in the cavities 816, and the cover 814 is combed with the main body 812, the cavity 816 of the main body 812 and the cavity 816 of the cover 814 are disposed to correspond to each other.

Next, the first electrode tabs 824 extending from one lateral face of the first electrode 821 and the second electrode tabs 825 extending from one lateral face of the second electrode 822 are connected to the first electrode lead 826 and the second electrode lead 827, respectively. Here, the connecting of the first electrode lead 826 and the second electrode lead 827 is performed by welding, for example, resistance welding.

To protect the first electrode lead 826 and the second electrode lead 827, an insulating tape 828 is formed at a predetermined region of each of the first electrode lead 826 and the second electrode lead 827.

Next, a sealing part 812c of the main body 812 is sealed with a sealing part 814c of the cover 814, thereby sealing the cavities 816 of the main body 812 and the cover 814.

The protective circuit module 850 is connected to the first electrode lead 826 and the second electrode lead 827, thereby completing the secondary battery according to the illustrated embodiment of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A secondary battery comprising:
an electrode assembly including a first electrode, a second electrode, and a separator;
a pouch configured to have a bottom surface of a rectangle shape and lateral surfaces extending from edges of the bottom surface which form a cavity to accommodate the electrode assembly, the lateral surfaces having four planes and four corners formed by each two adjacent ones of the four planes of the lateral surfaces;
at least one alignment indentation on at least one edge of the electrode assembly; and
at least one alignment protrusion on at least one of the corners of the lateral surfaces of the pouch and protruding into the cavity,
wherein the at least one alignment indentation is complementary to and aligning with the at least one alignment protrusion when the first electrode, the second electrode, and the separator are stacked with the cavity, such that the at least one alignment protrusion fits into the at least one alignment indentation.

2. The secondary battery of claim 1, wherein
the cavity has a rectangular prism shape formed by the bottom surface of the pouch, and
each corner formed by the lateral surfaces includes one of the at least one protrusion.

3. The secondary battery of claim 1, wherein a sealing part of the battery extends from the lateral surfaces of the pouch.

4. The secondary battery of claim 1, wherein the pouch has a three-layered structure, including an intermediate layer and two outer layers.

5. The secondary battery of claim 4, wherein the intermediate layer comprises a film made of a metal, and the two outer layers comprise an insulating material.

6. The secondary battery of claim 5, wherein the metal includes aluminum (Al) or copper (Cu).

7. The secondary battery of claim 1, wherein the at least one alignment protrusion has a horizontal section with a central angle of 90 degrees.

8. The secondary battery of claim 1, wherein the at least one alignment indentation is a horizontal section having an arc shape indented into the electrode assembly.

9. The secondary battery of claim 1, wherein the at least one alignment indentation is formed in at least one of the first electrode, the second electrode and the separator of the electrode assembly.

10. The secondary battery of claim 1, wherein the electrode assembly has a stacked structure in which the first electrode, the separator, and the second electrode are stacked.

11. The secondary battery of claim 10, wherein a size of the separator is greater than a size of the first and second electrode.

12. The secondary battery of claim 1, wherein the separator is an insulating-layer separator and is provided on an entire surface of the first electrode or the second electrode, and the first electrode and the second electrode are repeatedly stacked.

13. The secondary battery of claim 1, wherein the separator includes at least one insulating-layer separator provided on upper and lower surfaces of the first electrode or the second electrode, and the first electrode and the second electrode are repeatedly stacked to form at stacked structure.

14. The secondary battery of claim 13, wherein the first electrode and the second electrode form the stacked structure by fusing edges of the insulating-layer separators around one of the first and second electrodes.

15. The secondary battery of claim 1, wherein the electrode assembly includes first electrode tabs connected to first electrode leads and second electrode tabs connected to second electrode leads, wherein the tabs and leads are accommodated in a tab accommodating space formed between one face of the electrode assembly and one lateral surface of the pouch.

16. The secondary battery of claim 15, wherein the tab accommodating space is provided by making a width of a portion of the electrode assembly adjacent to the tabs smaller than a width of the cavity.

17. The secondary battery of claim 1, wherein the pouch includes a first tab cavity and a second tab cavity foamed along one of the lateral surfaces of the pouch to accommodate electrode tabs of the electrode assembly.

18. The secondary battery of claim 17, wherein the first tab cavity and the second tab cavity protrude outward from the one of the lateral surfaces of the pouch.

19. The secondary battery of claim 1, wherein the pouch includes a main body and a cover.

20. The secondary battery of claim 19, wherein the at least one alignment protrusion includes a plurality of the alignment protrusions, the main body includes the alignment protrusions on lateral surfaces of the main body, and each of the alignment protrusions has a semicircular cross sectional shape.

21. The secondary battery of claim 19, wherein the at least one alignment protrusion includes a plurality of the alignment protrusions, the main body includes the alignment protrusions on lateral surfaces of the main body, and each of the alignment protrusions has a rectangular cross sectional shape.

22. The secondary battery of claim 19, wherein the at least one alignment protrusion includes a plurality of the alignment protrusions, the main body includes the alignment protrusions at corners of lateral surfaces of the main body, and each of the alignment protrusions has a triangular cross sectional shape.

23. The secondary battery of claim 20, wherein the at least one alignment indentation includes a plurality of alignment indentations, and the electrode assembly includes the alignment indentations corresponding to the alignment protrusions on the lateral surfaces of the main body.

24. The secondary battery of claim 21, wherein the electrode assembly includes a plurality of alignment indentations corresponding to the plurality of alignment protrusions provided on the lateral surfaces of the main body.

25. The secondary battery of claim 22, wherein the electrode assembly includes a plurality of alignment indentations corresponding to the plurality of alignment protrusions provided at the corners of the lateral surfaces of the main body.

26. The secondary battery of claim 19, wherein the cover has a same shape as the main body.

27. The secondary battery of claim 19, wherein the cover includes a bottom surface and lateral surfaces extending from edges of the bottom surface and the cover includes the at least one alignment protrusion formed in at least one of the lateral surfaces.

28. The secondary battery of claim 1, wherein the electrode assembly includes tab grooves formed on one side, the one side being a side from which first electrode tabs and second electrode tabs extend.

29. A method for manufacturing the secondary battery of claim 1, the method comprising:

preparing a pouch having a cavity, the pouch including at least one alignment protrusion protruding into the cavity, wherein the pouch is configured to have a bottom surface of a rectangle shape and lateral surfaces extending from edges of the bottom surface which form a cavity to accommodate the electrode assembly, the lateral surfaces having four planes and four corners formed by each two adjacent ones of the four planes of the lateral surfaces;

preparing at least one of a first electrode, a second electrode, and a separator to include at least one alignment indentation complementary to the at least one alignment protrusion;

stacking the first electrode, the second electrode, and the separator with the cavity, wherein the first electrode, the separator, and the second electrode are aligned according to the at least one alignment protrusion fitting into the at least one alignment indentation; and sealing the pouch with the stacked and aligned first electrode, second electrode and the separator.

* * * * *